(12) United States Patent
Stump et al.

(10) Patent No.: US 11,880,680 B2
(45) Date of Patent: Jan. 23, 2024

(54) INDUSTRIAL AUTOMATION DISTRIBUTED PROJECT CONTROL WITH MILESTONE ROLLBACK

(71) Applicant: Rockwell Automation Technologies, Inc., Mayfield Heights, OH (US)

(72) Inventors: Andrew R Stump, Mentor, OH (US); Anthony Carrara, Strongsville, OH (US); Eashwer Srinivasan, Fremont, OH (US); Srdjan Josipovic, Beachwood, OH (US); Adam J Gregory, Oak Creek, WI (US); Michael J Coan, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/185,501

(22) Filed: Mar. 17, 2023

(65) Prior Publication Data

US 2023/0214213 A1  Jul. 6, 2023

Related U.S. Application Data

(63) Continuation of application No. 17/207,514, filed on Mar. 19, 2021, now Pat. No. 11,656,866.

(51) Int. Cl.
*G06F 8/71* (2018.01)
*G05B 19/418* (2006.01)
*G06F 8/73* (2018.01)

(52) U.S. Cl.
CPC .......... *G06F 8/71* (2013.01); *G05B 19/4184* (2013.01); *G05B 19/4185* (2013.01);
(Continued)

(58) Field of Classification Search
CPC .......... G05B 19/41835; G05B 19/4184; G05B 19/4185; G05B 2219/32095; G05B 2219/36062; G06F 8/73
(Continued)

(56) References Cited

U.S. PATENT DOCUMENTS

| 6,473,794 B1 | 10/2002 | Guheen et al. |
| 6,601,234 B1 | 7/2003 | Bowman-Amuah |

(Continued)

FOREIGN PATENT DOCUMENTS

| EP | 2 592 512 A2 | 5/2013 |
| EP | 2 045 676 B1 | 11/2016 |
| EP | 2 821 866 B1 | 12/2017 |

OTHER PUBLICATIONS

Non Final Office Action received for U.S. Appl. No. 17/148,919 dated Sep. 1, 2022, 41 pages.
(Continued)

*Primary Examiner* — John Q Chavis
(74) *Attorney, Agent, or Firm* — Amin, Turocy & Watson, LLP

(57) ABSTRACT

An industrial integrated development environment (IDE) supports collaborative tools that allow multiple designers and programmers to remotely submit design input to the same automation system project in parallel while maintaining project consistency. The industrial IDE also permits localized development of system projects, and provides an infrastructure for intelligently brokering between conflicting edits submitted to common portions of the system project. Project edits submitted to the IDE system, both applied and unapplied, are stored as edit records, allowing edits to be selectively undone or applied either manually or as part of a rollback to a milestone version.

20 Claims, 25 Drawing Sheets

(52) U.S. Cl.
CPC . *G05B 19/41835* (2013.01); *G05B 19/41845* (2013.01); *G06F 8/73* (2013.01); *G05B 2219/32095* (2013.01); *G05B 2219/36062* (2013.01)

(58) Field of Classification Search
USPC .......................................................... 717/121
See application file for complete search history.

(56) References Cited

U.S. PATENT DOCUMENTS

| | | | |
|---|---|---|---|
| 6,718,535 | B1 | 4/2004 | Underwood |
| 8,055,910 | B2 | 11/2011 | Kocher et al. |
| 8,510,571 | B1 | 8/2013 | Chang et al. |
| 8,667,456 | B1 | 3/2014 | Czymontek |
| 9,451,009 | B2 | 9/2016 | Assenmacher |
| 9,483,259 | B1 | 11/2016 | Lee et al. |
| 9,940,127 | B1 | 4/2018 | Lee et al. |
| 10,705,805 | B1 | 7/2020 | Bosworth et al. |
| 11,656,866 | B2 * | 5/2023 | Stump ................ G05B 19/4184 717/121 |
| 2005/0149759 | A1 | 7/2005 | Vishwanath et al. |
| 2007/0283321 | A1 | 12/2007 | Hegde et al. |
| 2008/0134298 | A1 | 6/2008 | Nathan et al. |
| 2008/0301650 | A1 | 12/2008 | Talluri et al. |
| 2013/0124649 | A1 | 5/2013 | Triantos et al. |
| 2014/0122613 | A1 | 5/2014 | Mashkif et al. |
| 2014/0330890 | A1 | 11/2014 | Hourani et al. |
| 2018/0129497 | A1 | 5/2018 | Biddle et al. |
| 2018/0247243 | A1 | 8/2018 | Moolman et al. |
| 2018/0349134 | A1 | 12/2018 | Studer et al. |
| 2020/0103843 | A1 | 4/2020 | Stump et al. |
| 2020/0160458 | A1 | 5/2020 | Bodin et al. |
| 2020/0192638 | A1 | 6/2020 | Pezaris |
| 2020/0201625 | A1 | 6/2020 | Kryzhanovsky et al. |
| 2020/0257516 | A1 | 8/2020 | Totale et al. |
| 2020/0356365 | A1 | 11/2020 | Pezaris |

OTHER PUBLICATIONS

Non Final Office Action received for U.S. Appl. No. 17/157,266 dated Jun. 20, 2022, 40 pages.
Dilley et al., "Globally Distributed Content Delivery", IEEE Internet Computing, 2002, pp. 50-58.
Butler et al., "A National-Scale Authentication Infrastructure", Computer, 2000, pp. 60-66.
Ward et al., "Integrated Change and Configuration Management", IBM Systems Journal, vol. 46, No. 3, 2007, pp. 459-478.
Non Final Office Action received for U.S. Appl. No. 17/207,514 dated Jul. 22, 2022, 23 pages.
Extended European Search Report received for European Patent Application Serial No. 22151134.8 dated Jun. 21, 2022, 12 pages.
Machura, Marek "Managing Information in a Co-Operative Object Database System", Software-Practice and Experience, vol. 26, No. 5, May 1996, pp. 545-579.
Extended European Search Report received for European Patent Application Serial No. 22152700.5 dated Jul. 22, 2022, 10 pages.
Fylaktopoulos et al., "An Overview of Platforms for Cloud Based Development", SpringerPlus, vol. 5, No. 38, 2016, pp. 1-13.
Extended European Search Report received for European Patent Application Serial No. 22162697.1 dated Aug. 3, 2022, 9 pages.
Communication pursuant to Rule 69 EPC received for European Patent Application Serial No. 22152700.5 dated Aug. 29, 2022, 2 pages.
Notice of Allowance received for U.S. Appl. No. 17/148,919 dated Jan. 4, 2023, 70 pages.
Biemann et al., "Collaborative Web-based Tools for Multi-layer Text Annotation", 2017, [Retrieved on Nov. 29, 2022]. Retrieved from the internet: <URL: https://www.inf.uni-hamburg.de/en/inst/ab/lt/publications/2017-biemannetal-hola-webbasedtools-preprint.pdf>, 29 pages.
Notice of Allowance received for U.S. Appl. No. 17/157,266 dated Oct. 19, 2022, 45 pages.
Walrad et al., "The Importance of Branching Models in SCM", Computer, 2002, pp. 31-38.
Garfinkel et al., "Terra: A Virtual Machine-Based Platform for Trusted Computing", Proceedings of the nineteenth ACM symposium on Operating systems principles, 2003, pp. 193-206.
Notice of Allowance received for U.S. Appl. No. 17/157,266 dated Dec. 2, 2022, 7 pages.
Notice of Allowance received for U.S. Appl. No. 17/207,514 dated Dec. 29, 2022, 40 pages.
Notice of Allowance received for U.S. Appl. No. 17/207,514 dated Feb. 16, 2023, 9 pages.
Notice of Allowance received for U.S. Appl. No. 17/157,266 dated Jan. 25, 2023, 7 pages.
Notice of Allowance received for U.S. Appl. No. 17/207,514 dated Apr. 4, 2023, 7 pages.
Notice of Allowance received for U.S. Appl. No. 18/155,787 dated Oct. 11, 2023, 54 pages.
Eick et al., "Does Code Decay? Assessing the Evidence from Change Management Data", IEEE, Transactions on Software Engineering, vol. 27, No. 1, Jan. 2001, 12 pages.
Graves et al., "Predicting Fault Incidence Using Software Change History", IEEE, Transactions on Software Engineering, vol. 26, No. 7, Jul. 2000, pp. 653-661.
Zimmermann et al., "Mining Version Histories to Guide Software Changes", IEEE, Transactions on Software Engineering, vol. 31, No. 6, Jun. 2005, pp. 429-445.
Communication pursuant to Article 94(3) EPC received for European Patent Application Serial No. 22152700.5 dated Sep. 9, 2023, 5 pages.

* cited by examiner

INDUSTRIAL AUTOMATION DISTRIBUTED PROJECT CONTROL WITH MILESTONE ROLLBACK

CROSS-REFERENCE TO RELATED APPLICATIONS

This application is a continuation of, and claims priority to, U.S. patent application Ser. No. 17/207,514, filed on Mar. 19, 2021, and entitled "INDUSTRIAL AUTOMATION DISTRIBUTED PROJECT CONTROL WITH MILESTONE ROLLBACK," the entirety of which is incorporated herein by reference.

BACKGROUND

The subject matter disclosed herein relates generally to industrial automation systems, and, for example, to industrial programming development platforms

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for collaborative cloud-based development of industrial applications is provided, comprising a memory configured to store system project data that, in response to deployment and execution on one or more industrial devices, facilitates monitoring and control of an industrial automation system; a user interface component configured to receive, from one or more client devices, edit records defining modifications to the system project data; and a collaboration management component configured to: apply a first subset of the edit records to the system project data and classify the first subset of the edit records as applied edit records, leave a second subset of the edit records unapplied to the system project data and classify the second subset of the edit records as unapplied edit records, in response to receipt of a first instruction to set a current version of the system project data as a milestone version, create a milestone record identifying a set of edit records that are currently applied to the system project data, and in response to receipt of a second instruction to roll the system project data back to the milestone version, selectively re-apply or un-apply, relative to the system project data, edits represented by selected edit records to restore, to the system project data, the set of edit records identified by the milestone record.

Also, one or more embodiments provide a method, comprising, maintaining, on a system that executes on a cloud platform and comprises a processor, system project data that, in response to execution on one or more industrial devices, facilitates monitoring and control of an industrial automation system; receiving, by the system from one or more client devices, edit records defining modifications to be performed on the system project data; applying, by the system, a first subset of the edit records to the system project data and classifying the first subset of the edit records as applied edit records; classifying, by the system, a second subset of the edit records that are not applied to the system project data as unapplied edit records; in response to receiving a first instruction to set a current version of the system project data as a milestone version, creating, by the system, a milestone record identifying a set of edit records that are currently applied to the system project data; and in response to receiving a second instruction to restore the system project data to the milestone version, reverting the system project data to the milestone version, herein the reverting comprises at least one of re-applying first edits defined by one of the unapplied edit record to the system project data or undoing second edits defined by one of applied edit records from the system project data.

Also, according to one or more embodiments, a non-transitory computer-readable medium is provided having stored thereon instructions that, in response to execution, cause a system comprising a processor and executing on a cloud platform to perform operations, the operations comprising maintaining, on the cloud platform, system project data that, in response to execution on one or more industrial devices, facilitates monitoring and control of an industrial automation system; receiving, from one or more client devices, edit records defining edits to be applied the system project data; applying a first subset of the edit records to the system project data and classifying the first subset of the edit records as applied edit records; classifying a second subset of the edit records that are not applied to the system project data as unapplied edit records; in response to receiving a first instruction to set a current version of the system project data as a milestone version, generating a milestone record identifying a set of edit records that are currently applied to the system project data; and in response to receiving a second instruction to restore the system project data to the milestone version, at least one of re-applying or undoing, relative to the system project data, edits represented by selected edit records to restore, to the system project data, the set of edit records identified by the milestone record.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
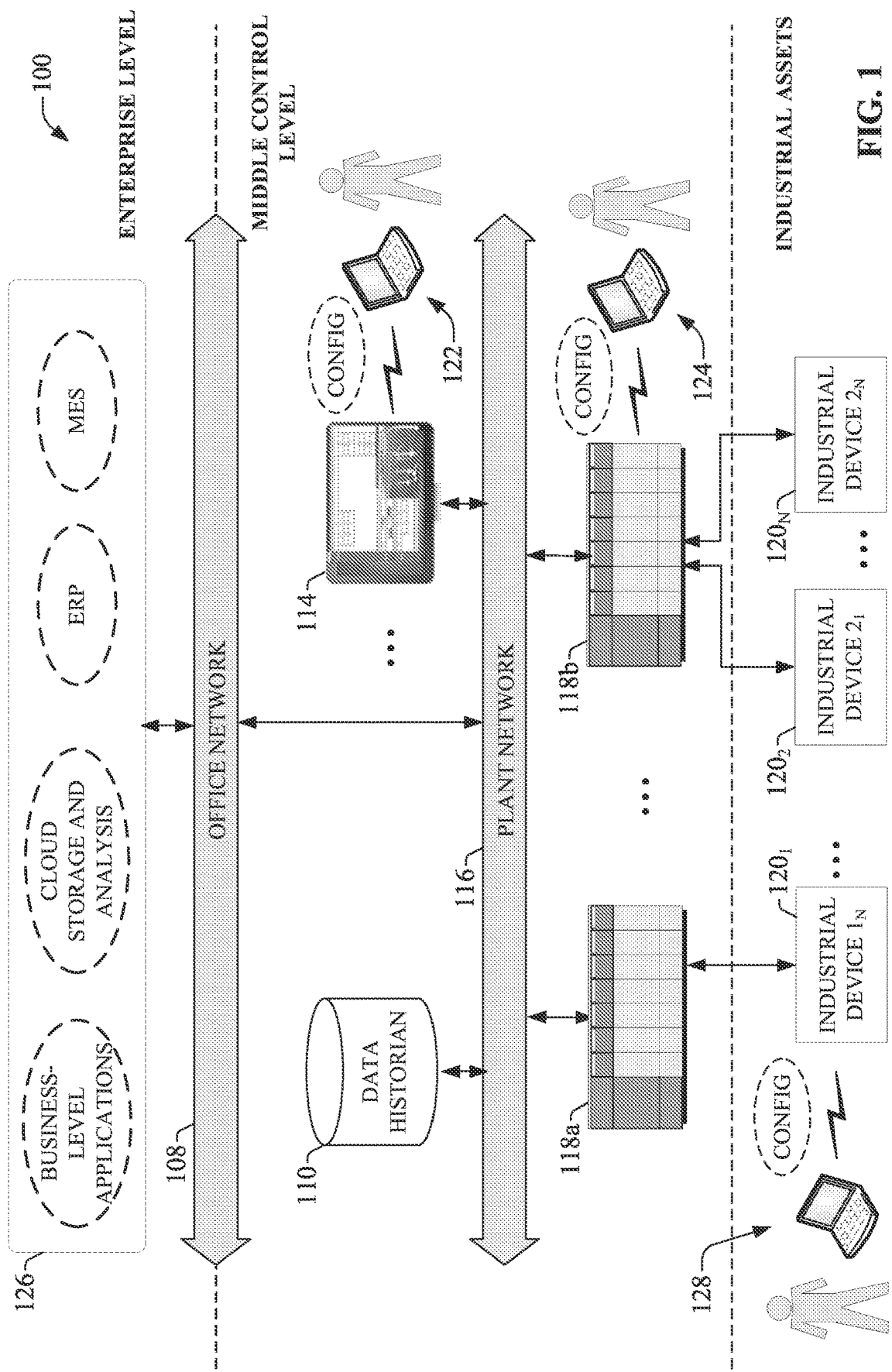
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller 110 can include digital 110 that transmits and receives discrete voltage signals to and from the field devices, or analog I/O that transmits and receives analog voltage or current signals to and from the devices. The controller 110 can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interface (HMI) terminals 114 that allow plant personnel to view telemetry and status data associated with the automation systems, and to control some aspects of system operation. HMI terminals 114 may communicate with one or more of the industrial controllers 118 over a plant network 116, and exchange data with the industrial controllers to facilitate visualization of information relating to the controlled industrial processes on one or more pre-developed operator interface screens. HMI terminals 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMI terminals 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMI terminals 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMI terminals 114 using an HMI development platform (e.g., executing on client device 122) and download the resulting visualization files to the HMI terminals 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc.—may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

Industrial development platforms are also limited in their ability to support a collaborative development environment that allows multiple developers to work on a given automation system project in parallel.

To address at least some of these or other issues, one or more embodiments described herein provide an integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise.

Cloud-based embodiments of the industrial IDE can also support collaborative tools that allow multiple designers and programmers to remotely submit design input to the same automation system project in parallel while maintaining project consistency. These collaborative features can include, for example, brokering between different sets of design input directed to the same portion of the system project, generating notifications to remote designers when a portion of the system project is modified, sharing of development interfaces or environments, facilitating involvement of outside technical support experts to assist with design issues, or other such features.

Figure 2:
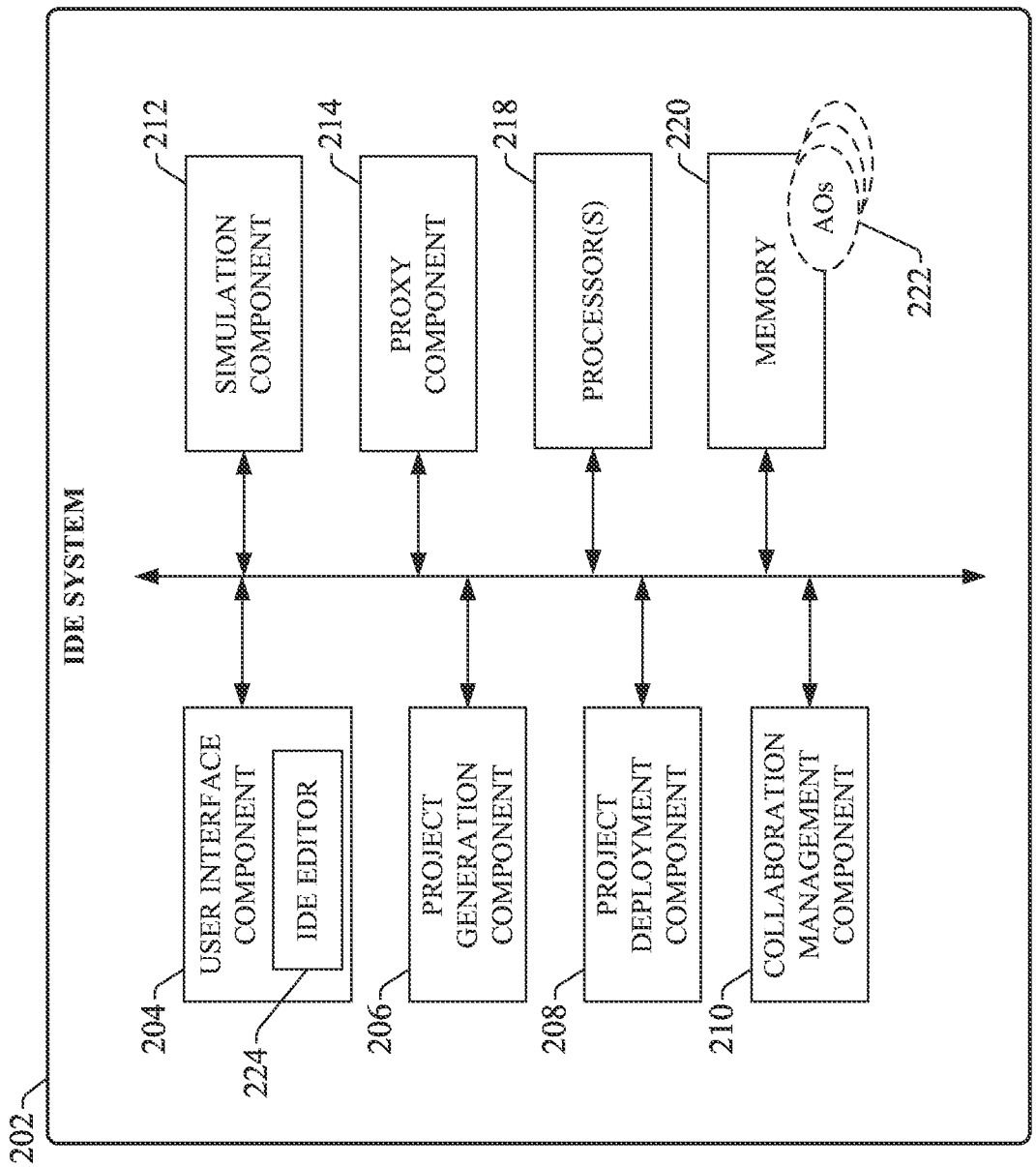
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, a collaboration management component 210, a simulation component 212, a proxy component 214, one or more processors 218, and memory 220. In various embodiments, one or more of the user interface component 204, project generation component 206, project deployment component 208, collaboration management component 210, simulation component 212, proxy component 214, the one or more processors 218, and memory 220 can be electrically and/or communicatively coupled to one another to perform one or more of the functions of the IDE system 202. In some embodiments, components 204, 206, 208, 210, 212, and 214 can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve suitable interface screens to a client device (e.g., program development screens), and exchange data via these interface screens. Input data that can be received via various embodiments of user interface component 204 can include, but is not limited to, programming code, industrial design specifications or goals, engineering drawings, AR/VR input, domain specific language (DSL) definitions, video or image data, or other such input. Output data rendered by various embodiments of user interface component 204 can include program code, programming feedback (e.g., error and highlighting, coding suggestions, etc.), programming and visualization development screens, etc.

Project generation component 206 can be configured to create a system project comprising one or more project files based on design input received via the user interface component 204, as well as industrial knowledge, predefined code modules and visualizations, and automation objects 222 maintained by the IDE system 202. Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

Collaboration management component 210 can be configured to manage and regulate design input submitted by multiple developers in a manner that ensures project consistency and coordination between developers. Simulation component 212 can be configured to perform test simulations on different versions of design input directed to a common aspect of a system project and submit the results to the collaboration management component 210 for the purposes of selecting between the different design ideas for inclusion in the system project. Proxy component 214 can be configured to manage connectivity and sharing of project information between developers and remote technical support.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
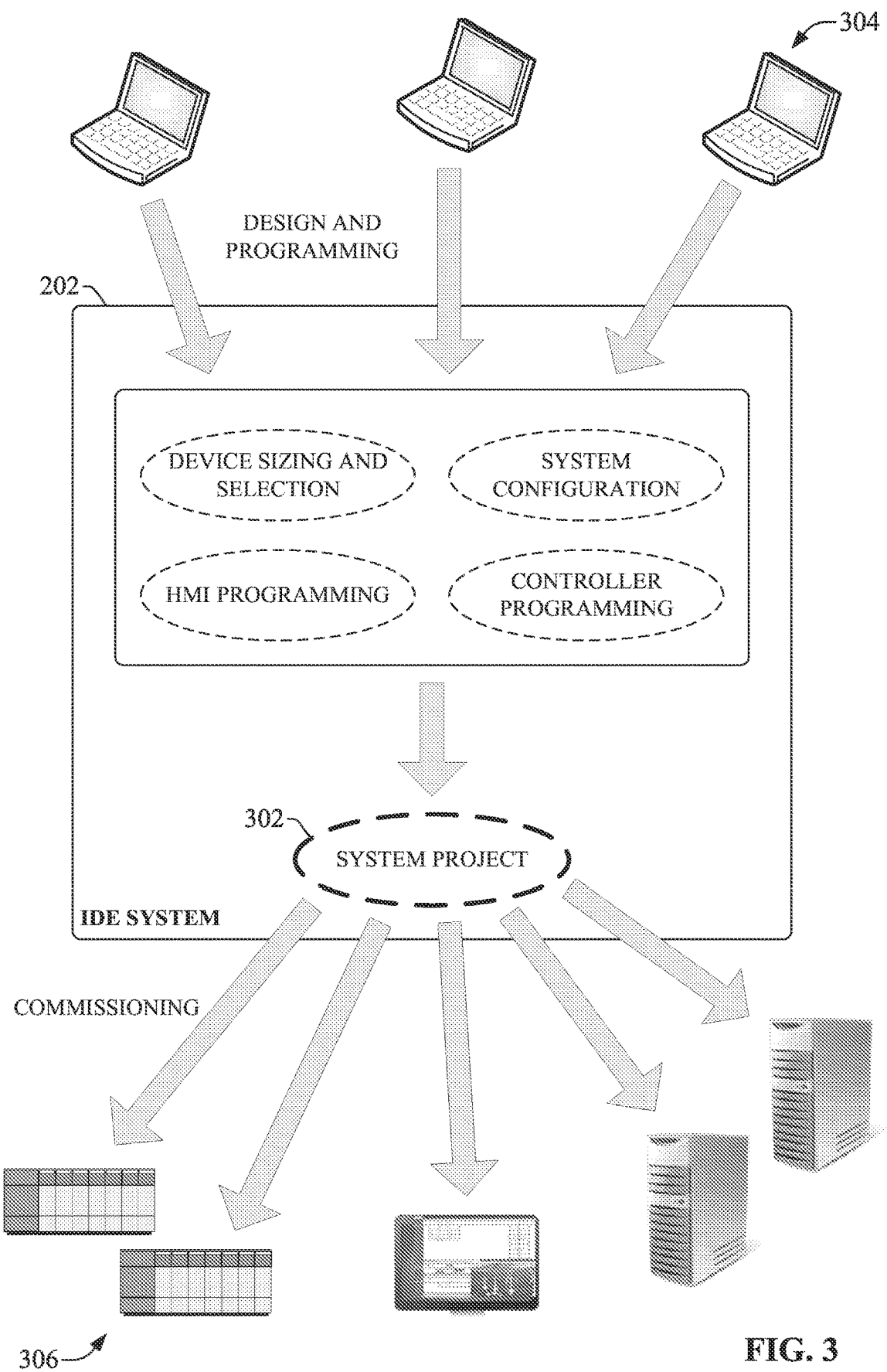
FIG. 3 is a diagram illustrating a generalized architecture of an industrial IDE system.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency. Collaborative features supported by the industrial IDE system are described in more detail herein.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
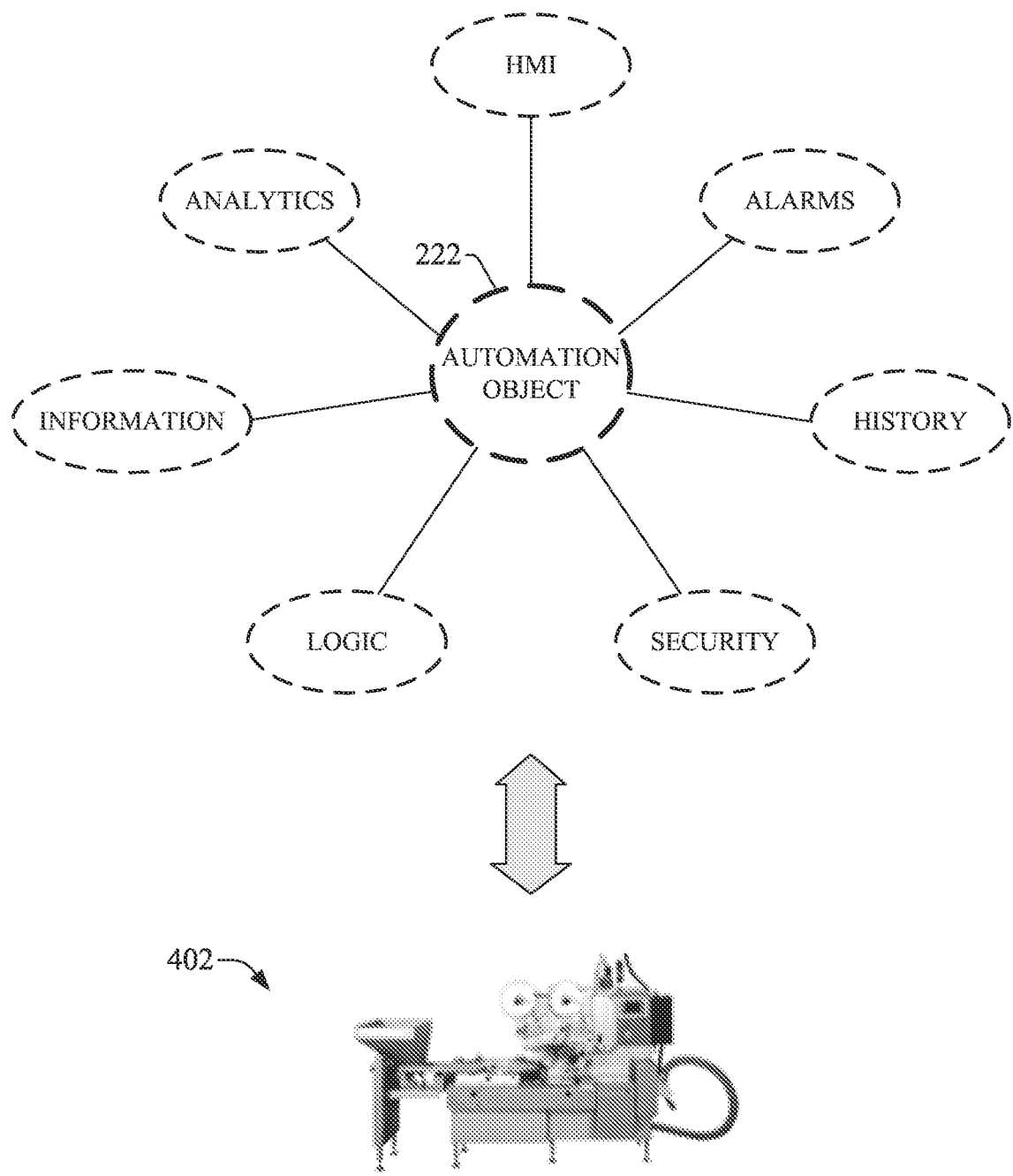
FIG. 4 is a diagram illustrating several example automation object properties that can be leveraged by the IDE system in connection with building, deploying, and executing a system project.

To support enhanced development capabilities, some embodiments of IDE system 202 can be built on an object-based data model rather than a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols, validation reports, simulations, schematics, security protocols, and other such properties associated with the industrial asset 402 represented by the object 222. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402 and can be incorporated into a system project 302 as elements of control code, a 2D or 3D visualization, a knowledgebase or maintenance guidance system for the industrial assets, or other such aspects.

Figure 5:
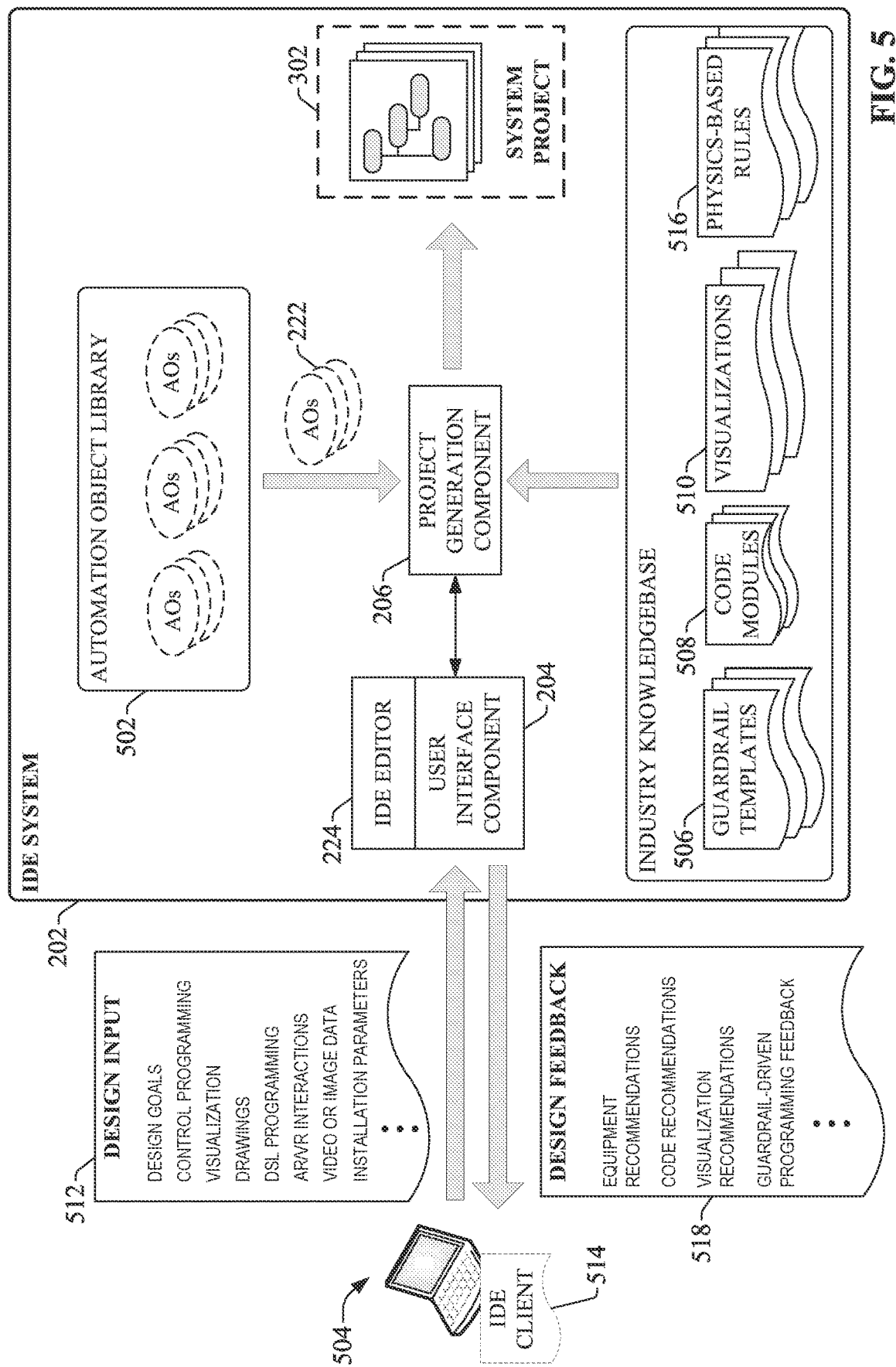
FIG. 5 is a diagram illustrating example data flows associated with creation of a system project for an automation system being designed using an industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) executing an IDE client 514 can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P&ID drawings, mechanical drawings, flow diagrams, or other such documents. For example, a P&ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

The IDE system 202 can also determine whether predefined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

In another example, markings applied to an engineering drawing by a user can be understood by some embodiments of the project generation component 206 to convey a specific design intention or parameter. For example, a marking in red pen can be understood to indicate a safety zone, two circles connected by a dashed line can be interpreted as a gearing relationship, and a bold line may indicate a camming relationship. In this way, a designer can sketch out design goals on an existing drawing in a manner that can be understood and leveraged by the IDE system 202 to generate code and visualizations. In another example, the project generation component 206 can learn permissives and interlocks (e.g., valves and their associated states) that serve as necessary preconditions for starting a machine based on analysis of the user's CAD drawings. Project generation component 206 can generate any suitable code (ladder logic, function blocks, etc.), device configurations, and visualizations based on analysis of these drawings and markings for incorporation into system project 302. In some embodiments, user interface component 204 can include design tools for developing engineering drawings within the IDE platform itself, and the project generation component 206 can generate this code as a background process as the user is creating the drawings for a new project. In some embodiments, project generation component 206 can also translate state machine drawings to a corresponding programming sequence, yielding at least skeletal code that can be enhanced by the developer with additional programming details as needed.

Also, or in addition, some embodiments of IDE system 202 can support goal-based automated programming. For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

Some embodiments of project generation component 206 can also monitor customer-specific design approaches for commonly programmed functions (e.g., pumping applications, batch processes, palletizing operations, etc.) and generate recommendations for design modules (e.g., code modules 508, visualizations 510, etc.) that the user may wish to incorporate into a current design project based on an inference of the designer's goals and learned approaches to achieving the goal. To this end, some embodiments of project generation component 206 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 206 can record these learned correlations and generate recommendations during subsequent project development sessions based on these correlations. For example, if project generation component 206 determines, based on analysis of design input 512, that a designer is currently developing a control project involving a type of industrial equipment that has been programmed and/or visualized in the past in a repeated, predictable manner, the project generation component 206 can instruct user interface component 204 to render recommended development steps or code modules 508 the designer may wish to incorporate into the system project 302 based on how this equipment was configured and/or programmed in the past.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc.—in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programming is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database (e.g., on memory 220). These code modules 508 comprise standardized coding segments for controlling common industrial tasks or applications (e.g., palletizing, flow control, web tension control, pick-and-place applications, conveyor control, etc.). In some embodiments, code modules 508 can be categorized according to one or more of an industrial vertical (e.g., automotive, food and drug, oil and gas, textiles, marine, pharmaceutical, etc.), an industrial application, or a type of machine or device to which the code module 508 is applicable. In some embodiments, project generation component 206 can infer a programmer's current programming task or design goal based on programmatic input being provided by a the programmer (as a subset of design input 512), and determine, based on this task or goal, whether one of the pre-defined code modules 508 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. This environmental information can also be obtained from an existing digital twin of the plant, or by analysis of scanned environmental data obtained by a wearable AR appliance in some embodiments. Project generation component 206 can analyze this image, video, or digital twin data to identify physical elements within the installation area (e.g., walls, girders, safety fences, existing machines and devices, etc.) and physical relationships between these elements. This can include ascertaining distances between machines, lengths of piping runs, locations and distances of wiring harnesses or cable trays, etc. Based on results of this analysis, project generation component 206 can add context to schematics generated as part of system project 302, generate recommendations regarding optimal locations for devices or machines (e.g., recommending a minimum separation between power and data cables), or make other refinements to the system project 302. At least some of this design data can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a specified flow control application, wiring gauges suitable for an expected electrical load, minimum distances between signal wiring and electromagnetic field (EMF) sources to ensure negligible electrical interference on data signals, or other such design features that are dependent on physical rules.

In an example use case, relative locations of machines and devices specified by physical environment information submitted to the IDE system 202 can be used by the project generation component 206 to generate design data for an industrial safety system. For example, project generation component 206 can analyze distance measurements between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain).

In some embodiments, project generation component 206 can also analyze photographic or video data of an existing machine to determine inline mechanical properties such as gearing or camming and factor this information into one or more guardrail templates 506 or design recommendations.

Figure 6:
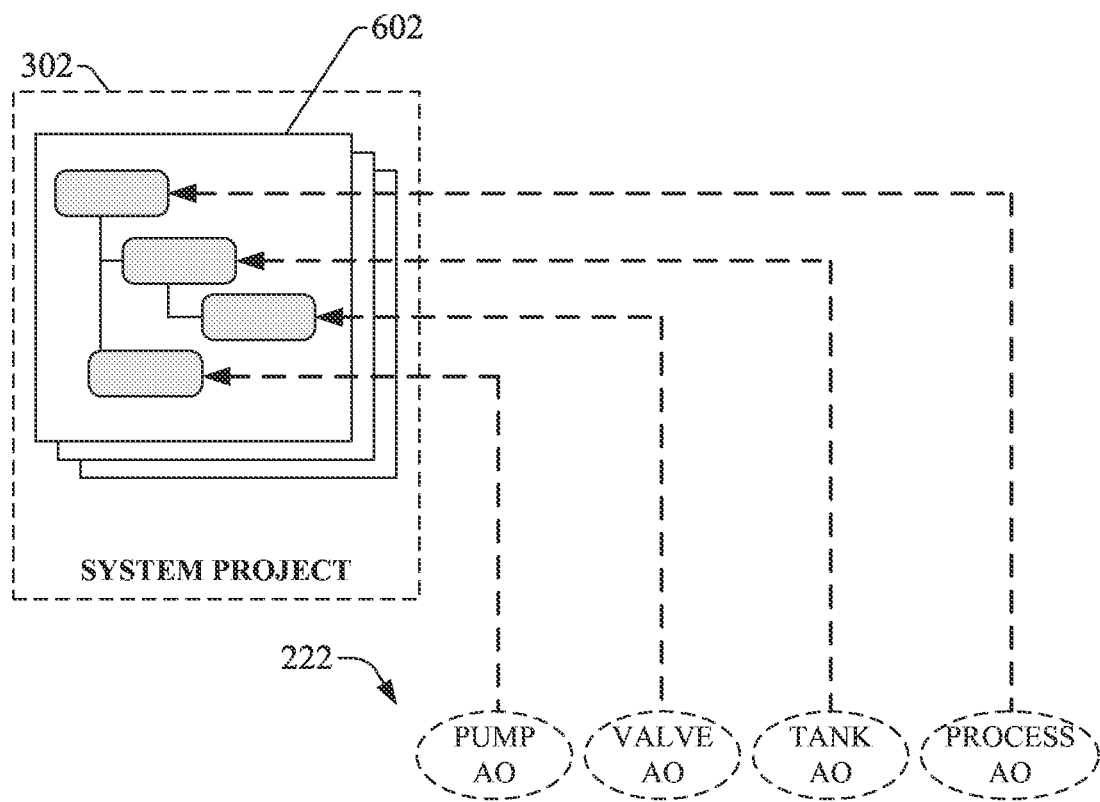
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. Other properties can be modified or added by the developer as needed (via design input 512) to customize the object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
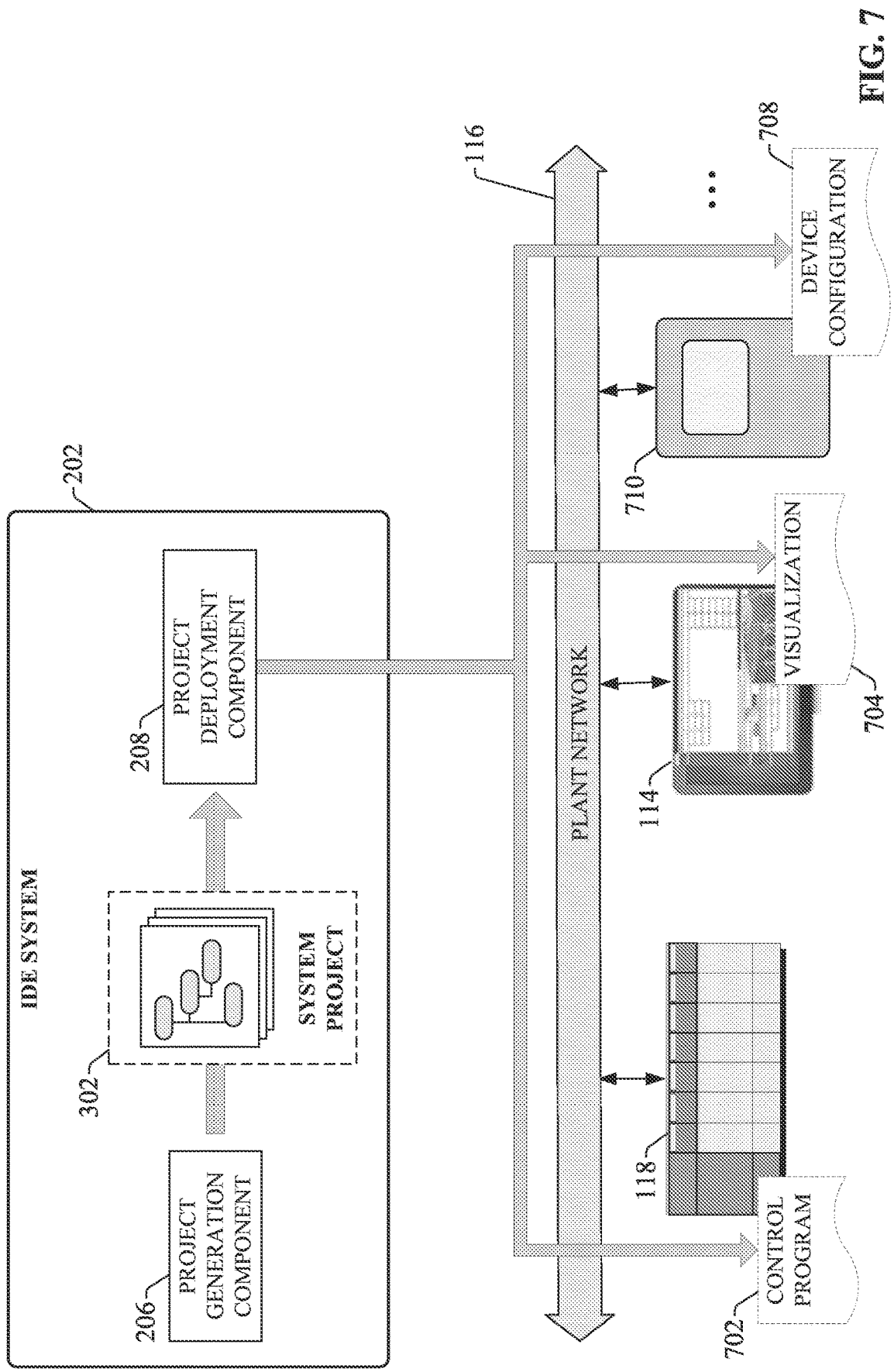
FIG. 7 is a diagram illustrating commissioning of a system project.

Once development on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target devices—including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
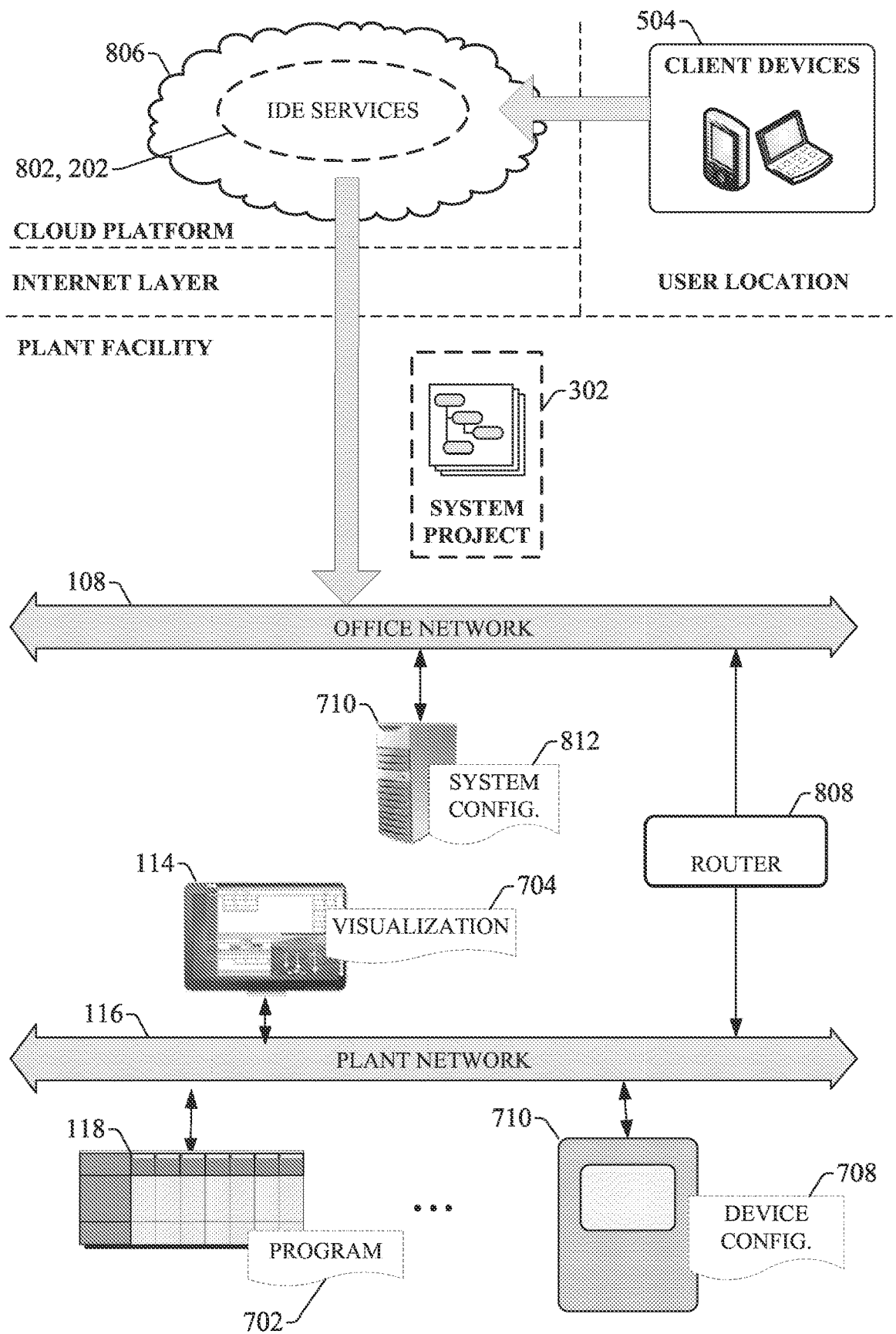
FIG. 8 is a diagram illustrating an example architecture in which cloud-based IDE services are used to develop and deploy industrial applications to a plant environment.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 801 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 810 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Cloud-based implementations of IDE system 202 can facilitate collaborative development by multiple remote developers who are authorized to access the IDE services 802. When a system project 302 is ready for deployment, the project 302 can be commissioned to the plant facility via a secure connection between the office network 108 or the plant network 116 and the cloud platform 806. As discussed above, the industrial IDE services 802 can translate system project 302 to one or more appropriate executable files—control program files 702, visualization applications 704, device configuration files 708, system configuration files 812—and deploy these files to the appropriate devices in the plant facility to facilitate implementation of the automation project.

Figure 9:
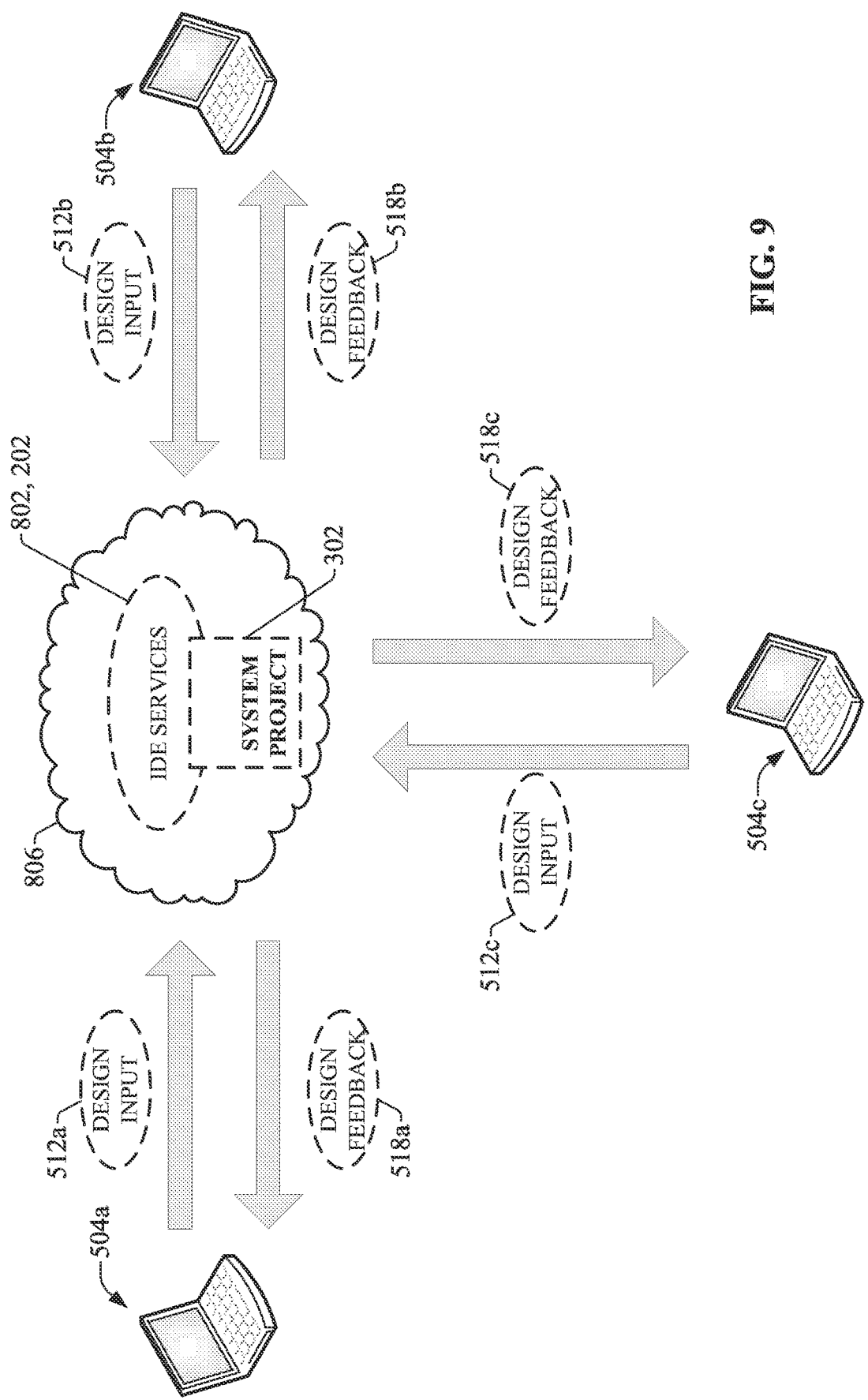
FIG. 9 is a diagram illustrating multi-tenancy of the cloud-based industrial IDE services in which different remote client devices leverage centralized industrial IDE services to individually submit design input directed to a common system project.

As noted above in connection with FIG. 8, some embodiments of IDE system 202 can reside on a cloud platform 806 and execute as a set of cloud-based IDE service 802 that are accessible to authorized remote client devices 504. This allows multiple end users to access and utilize the industrial IDE services 802 for development of industrial system projects 302. FIG. 9 is a diagram illustrating multi-tenancy of the cloud-based industrial IDE services 802 in which different remote client devices 504a-504c leverage the centralized industrial IDE services 802 to individually submit design input 512 directed to a common system project 302. Using this architecture, multiple remote developers can submit design input 512 to a common industrial automation system project 302, facilitating parallel development by multiple remote designers. The industrial IDE system 202 can support collaborative design tools that manage and regulate these diverse sets of design input 512 to ensure consistency and optimization of the system project 302.

In this example, the industrial IDE services 802 are made accessible to multiple authorized clients (associated with respective client devices 504a-504c) in a secure manner. Using respective design interfaces served to the client devices 504a-504c by the IDE services 802, developers at each client device can interface with the IDE services 802 to submit design input 512a-512c directed to a common industrial system project. As discussed above, IDE services 802 will generate and render individual design feedback 518a-518c to each user's client device 504a-504c as each user proceeds through their project development workflow. System project 302 is securely stored on the cloud platform 806 during development, and upon completion can be deployed from the cloud platform 806 to the automation system devices that make up the automation system from the cloud platform (as depicted in FIG. 8) or can be downloaded to a client device for localized deployment from the client device to one or more industrial devices. Since IDE services 802 reside on a cloud-platform with access to internet-based resources, some embodiments of the IDE services 802 can also allow users to access remote web-based knowledge-bases, vendor equipment catalogs, or other sources of information that may assist in developing their industrial control projects.

Cloud-based IDE services 802 can support true multi-tenancy across the layers of authentication authorization, data segregation at the logical level, and network segregation at the logical level. End users can access the industrial IDE services 802 on the cloud platform 806, and each end user's development data—including design input 512, design feedback 518, and system projects 302—is encrypted such that each end user can only view data associated with their own industrial enterprise. In an example implementation, an administrator of the cloud-based industrial IDE services 802 may maintain a master virtual private cloud (VPC) with appropriate security features, and each industrial enterprise can be allocated a portion of this VPC for their own developer's access to the IDE services 802. In an example embodiment, an encrypted multi-protocol label switching (MPLS) channel can protect the entire corpus of an end user's data such that the data can only be viewed by specific computers or domains that have an appropriate certificate.

Figure 10:
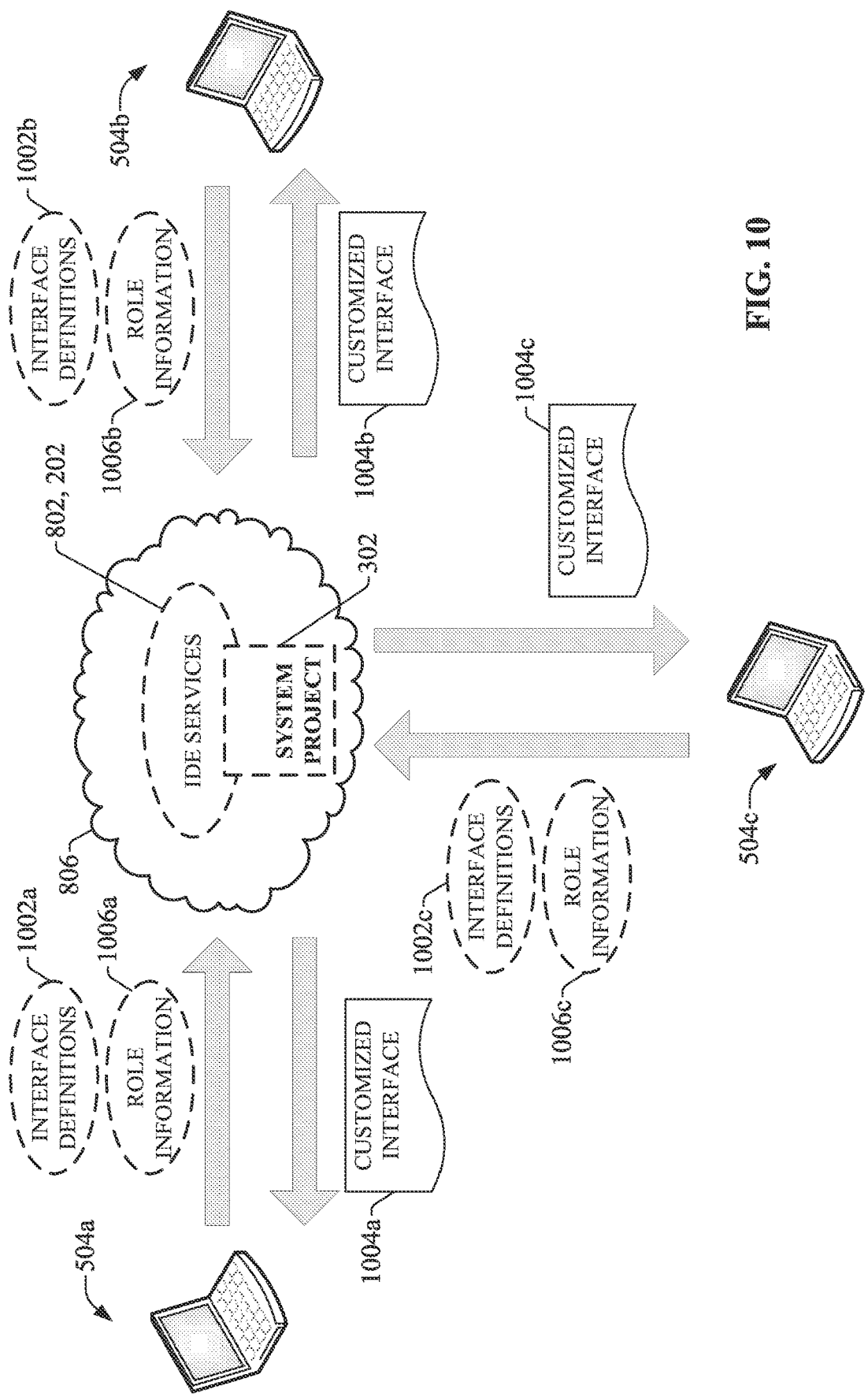
FIG. 10 is a diagram illustrating multi-tenancy of cloud-based industrial IDE services in which respective client devices are permitted to separately customize their own development environment interfaces.

In some embodiments, IDE services 802 can permit different collaborative developers working on the same system project 302 to independently customize their version of the development platform interface as desired, and to interface with the master copy of the system project 302 with their own customized development interfaces. FIG. 10 is a diagram illustrating multi-tenancy of the cloud-based industrial IDE services 802 in which each client device 504 is permitted to separately customize their own development environment interfaces 1004a-1004c. In this example architecture, each client device 504a-504c can separately submit interface definition data 1002a-1002c to thereby individually configure their own customized development platform interfaces 1004a-1004c and set their preferred forms of dynamic design feedback.

Also, in some embodiments, the look and available functionality offered by a given instance of a development platform interface 1004 may be a function of a role of the developer accessing the IDE services 802, as determined by role or user identity information 1006 submitted by the developer. In such embodiments, the subset of available IDE functionality to be made available to a given developer role may be defined by user role definitions stored on the IDE system 202. The user interface component 203 and IDE editor 224 can access these user role definitions in view of the role and/or user identity information 1006 submitted by a developer to determine how that developer's customized interface 1004 should be customized. In an example scenario, a developer having a lead developer role may be granted a broader set of development features—e.g., design override privileges, the ability to track design contributions of individual developers, etc.—relative to developers having subsidiary roles. In another example, the set of guardrail templates 506 applied within a given user's customized interface 1004 may be a function of the user's role, such that design modifications permitted to be submitted by the user is regulated by predefined guardrail templates 506 appropriate to the developer's role.

Figure 11:
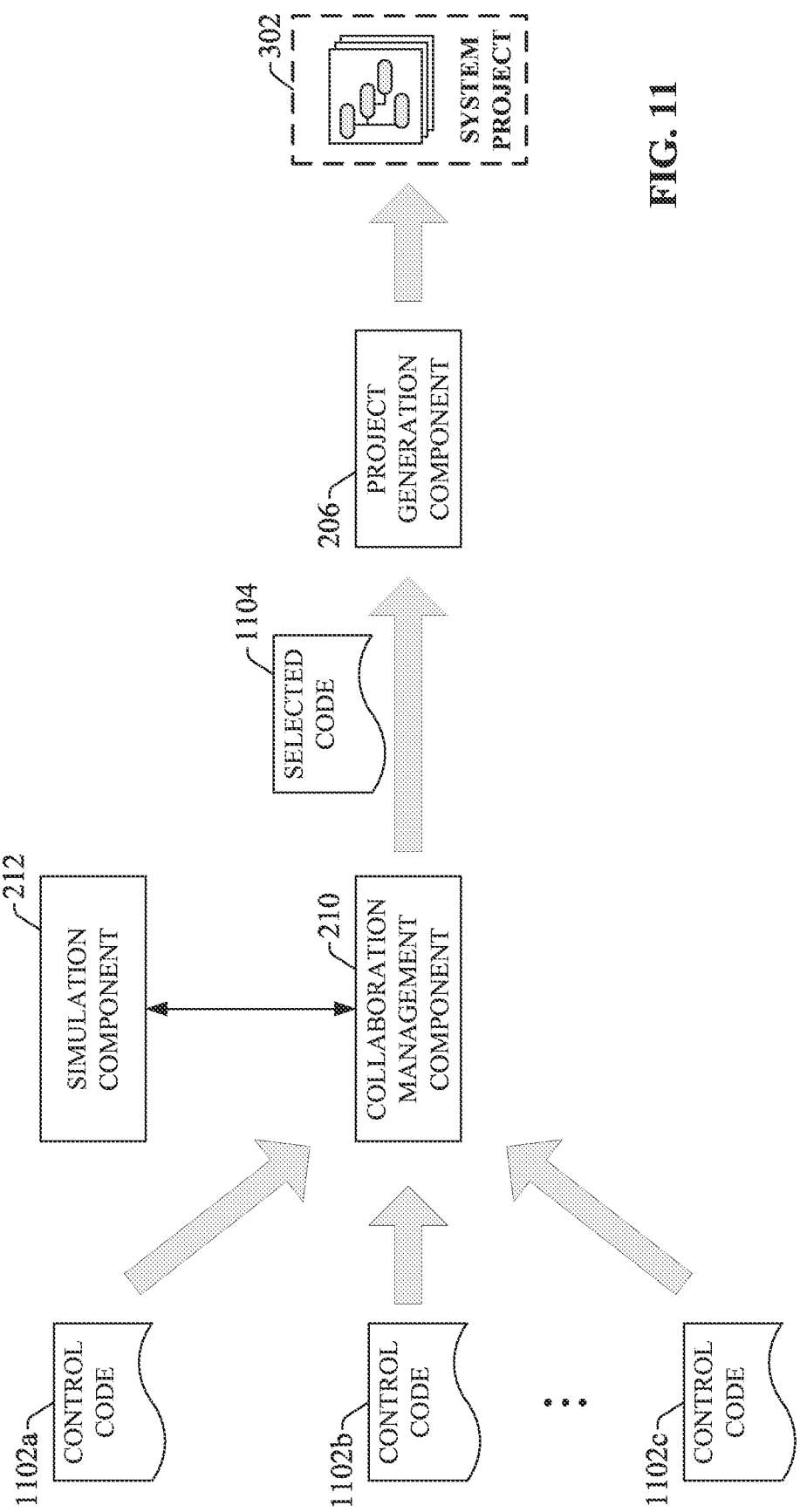
FIG. 11 is a diagram illustrating mediation or brokering between different sets of design input directed to the same aspect of a system project.

Collaborative tools supported by the IDE system 202 can manage design contributions from the multiple collaborative developers and perform version control of the aggregate system project 302 to ensure project consistency. In the context of this collaborative design environment, in which different individuals or groups perform parallel development on a common system project 302, there may be scenarios in which multiple developers submit design input 512 (e.g., control programming, visualization application development, device configuration settings, etc.) directed to the same portion of the system project 302. FIG. 11 is a diagram illustrating mediation or brokering between different sets of design input directed to the same aspect of a system project 302 according to some embodiments. In this example, multiple project developers working on development of a system project 302 for an industrial automation system have submitted, as part of design input 512, respective different, mutually exclusive versions of control code 1102a-1102c to be included in the system project 302. These versions of the control code 1102 may be, for example, alternative versions of a particular control routine, custom automation object, or another aspect of the system project 302.

The IDE system's collaboration management component 210 can compare control code 1102 submitted by multiple parties for the same code block and select the one of the alternative sets of control code 1102 for integration into the project. In this regard, collaboration management component 210 can apply any suitable criterion to select the preferred version of the control code 1102. For example, in some embodiments collaboration management component 210 can select the version of the control code 1102 that performs the same control function with the least lines of code. In another example, collaboration management component 210 may select the version of the code that is estimated to control its associated mechanical asset with the least stress on the machinery. In this case, estimations of the amount of stress applied to the controlled industrial assets can be determined by the collaboration management component 210 based on an analysis of the respective versions of the control code 1102 in view of built-in industrial expertise regarding how the respective control sequences will affect the mechanical assets.

For example, collaboration management component 210 may analyze each version of the control code 1102 to determine an estimated machine cycle frequency that will result from execution of each version of the control code 1102. Since higher frequencies correlate to faster machine wear, collaboration management component 210 may select the version of the control code 1102 that is estimated to perform the control function with a smallest machine cycle frequency without causing the product throughput to fall below a defined minimum. In another example, collaboration management component 210 may estimate expected ranges of motion of a mechanical asset (e.g., a motion device) that will be implemented by each version of the control code 1102, or a number of individual mechanical motions that will be implemented by the respective versions of the control code 1102 to perform the same function, and select the version of the control code that is expected to implement the control function using the shortest motions or least number of motions. Other types of predictive control analysis and corresponding version selection criteria are within the scope of one or more embodiments. Based on results of such analyses, collaboration management component 210 can select one of the versions of the control code 1102 as being a most suitable version, and project generation component 206 will integrate this selected version of the code 1104 into the system project 302.

Figure 12:
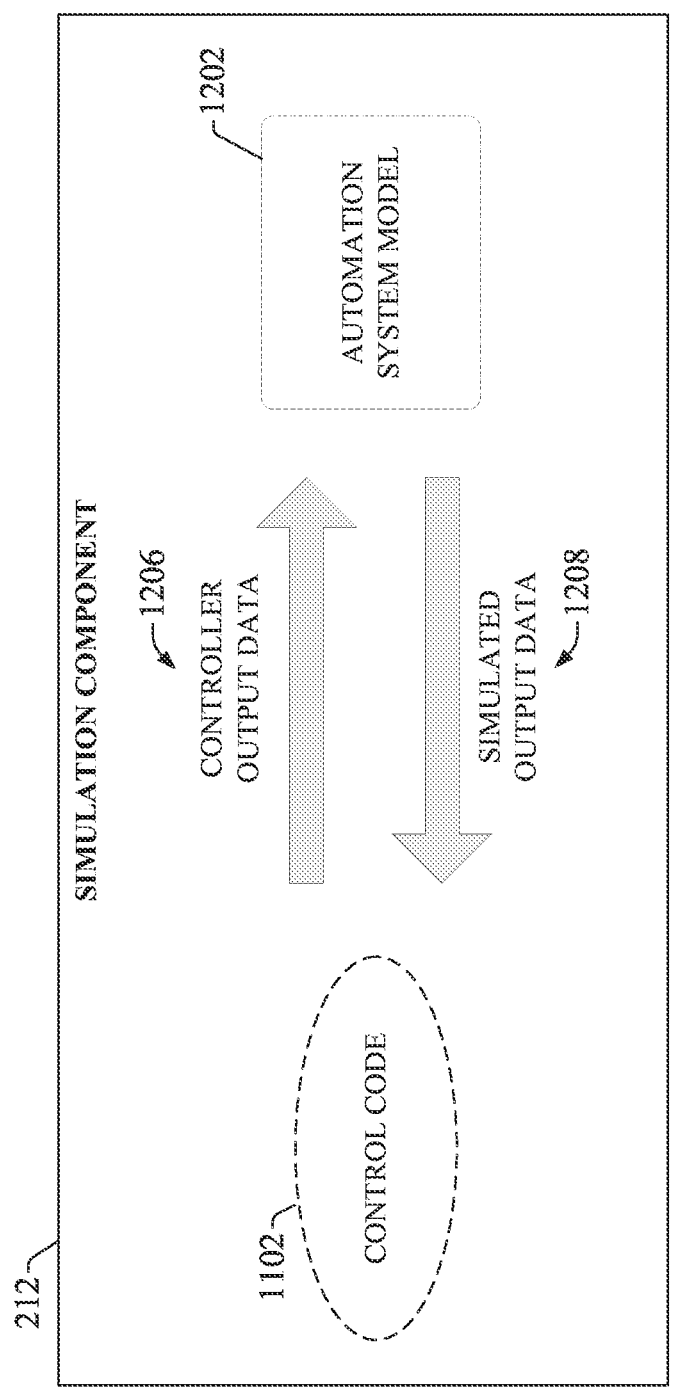
FIG. 12 is a diagram illustrating interactions between a version of control code being tested and an automation system model.

In some embodiments, collaboration management component 210 can leverage a simulation component 212 in connection with assessing the respective different versions of the control code 1102. Simulation component 212 can be configured to simulate control of an automation system (or a portion thereof) by the respective versions of the control code 1102 and provide results of the simulations to the collaboration management component 210, which selects the preferred version of the code 1104 based on these results. Any of the example types of assessment analyses described above may be performed using control simulations carried out by the simulation component 212. In some embodiments, simulation component 212 can leverage a digital model of the automation system for which system project 302 is being developed in connection with simulating the different versions of the control code 1102. FIG. 12 is a diagram illustrating interactions between a version of control code 1102 being tested and an automation system model 1202. In this example, the IDE system's simulation component 212 acts as an industrial controller emulator to execute control code 1102 (or control code portion) against automation system model 1202.

Automation system model 1202 can simulate various aspects of the physical industrial automation system to be monitored and regulated by the system project 302. Simulation component 212 can virtually interface control code 1102 with the automation system model 1202 to exchange virtual I/O data in order to simulate real-world control. Automation system model 1202 mathematically models the system to be regulated by generating digital and analog I/O values representing, for example, sensor outputs, metering outputs, or other plant data analogous to the data expected to be generated by the physical system being modeled. These inputs and outputs can be defined for each industrial asset by the model 1202.

Simulation component 212 provides this simulated output data 1208 to the control code 1102, which receives this data as one or more virtual physical inputs. Control code 1102 processes these inputs according to the developer's control programming and generates digital and/or analog controller output data 1206 based on the processing. This output data 1206 represents the physical outputs that would be generated by a controller executing control code 1102 and transmitted to the hardwired field devices comprising the automation system (e.g., PID loop control outputs, solenoid energizing outputs, motor control outputs, etc.). The controller output data 1206 is provided to the appropriate input points of the automation system model 1202, which updates the simulated output data 1208 accordingly.

Simulation component 212 can be configured to execute and monitor this simulation and to quantify one or more performance criteria based on results of the simulation that will be used by the collaboration management component 210 to select a preferred version of the control code 1102 for inclusion in system project 302. These performance criteria can include, for example, an amount of wear on the controlled mechanical equipment, an amount of energy consumed as a result of controlling the automation system using the control code 1102, an amount of product throughput as a result of controlling the automation system using the control code 1102, an amount of maintenance required, or other such criteria.

In some embodiments, if two or more of the different versions of control code 1102 are not necessarily mutually exclusive but overlap in some areas, collaboration management component 210 can manage comparing and merging the two or more versions within the master copy of the system project 302. This can include, for example, identifying and deleting redundant or identical code portions of the two or more versions, identifying competing versions of the same portion of control code and selecting a preferred version for inclusion in the system project 302, identifying conflicting control actions defined by two or more versions and either recommending a modification to resolve the conflict or automatically implementing the modification, or other such actions.

Although FIGS. 11 and 12 depicts the alternative design input as being control code 1102, collaboration management component 210 (with or without the assistance of simulation component 212) can also mediate or broker between other types of project elements, including but not limited to visualization aspects (e.g., HMI screens, AR/VR objects, etc.), device parameter settings, engineering drawings, etc.

Also, some embodiments of simulation component 212 can be configured to perform a risk analysis of a proposed update to the system project 302 submitted via a developer's design input 512. For example, in response to receipt of an update or revision to a portion of a control program included in the system project 302, simulation component 212 can initiate a risk analysis of the proposed update to determine possible ramifications of the update. As part of this risk assessment, simulation component 212 may perform a regression analysis on the system project 302 as a whole to determine which other aspects of the system project are likely to be affected by the proposed modification, and use simulation techniques or other types of analysis to determine how the update will affect performance of these other related aspects. Based on results of this analysis, the user interface component 204 may generate a message on the developer's interface 1004 warning of possible impacts of the modification on other portions of the system project 302, and prompt the user to acknowledge the warning prior to implementing the change into the system project 302.

Figure 13:
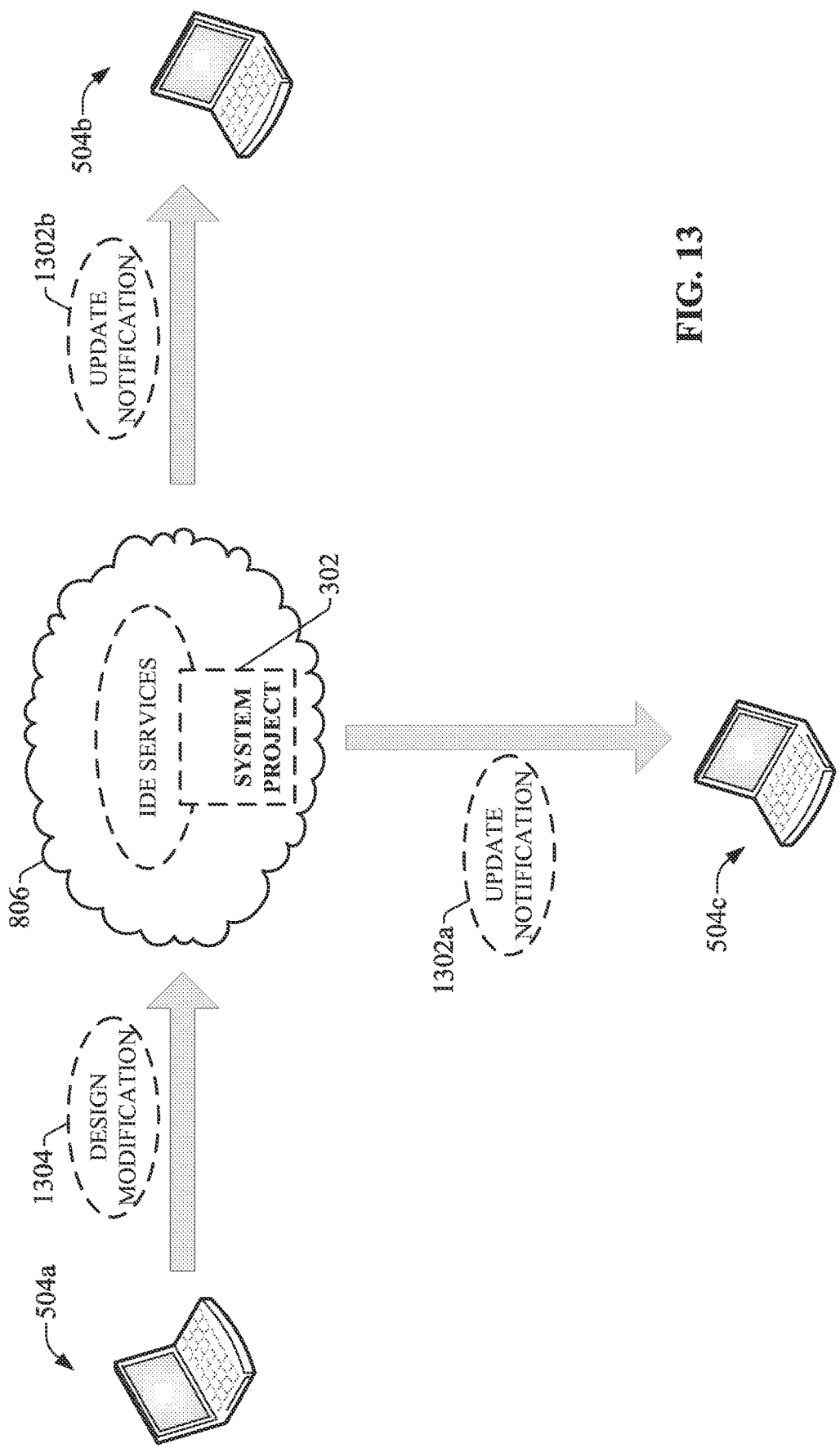
FIG. 13 is a diagram illustrating distribution of update notifications to selected developers in response to receipt of a proposed design modification from another developer.

In some embodiments in which different developers are working on respective different portions of the system project 302, the user interface component 204 may also send warnings to selected other developers whose portions of the system project 302 are determined to be affected by the initiating developer's proposed update. FIG. 13 is a diagram illustrating distribution of update notifications 1302 to selected developers in response to receipt of a proposed design modification 1304 from another developer (the developer associated with client devices 504a in the illustrated example). As described above, submission of a design modification 1304 by a developer directed to a portion of the system project 302 can initiate a regression analysis on the system project 302 to identify other portions of the system project 302 that may be affected by the modification 1304. In various embodiments, collaboration management component 210 can identify the affected portions of the system project 302 based on learned interdependencies across the system project, including but not limited to programmatic relationships or dependencies between control code segments or routines, dependencies between control code segments and visualization elements, dependencies between control code and engineering drawings (e.g., 110 drawings, electrical drawings, panel layout drawings, etc.), or other such relationships. Collaboration management component 210 can also identify hierarchical relationships between automation objects and/or control code routines or modules defined by the project data model 602.

Based on these learned interdependencies, collaboration management component 210 can identify the portion of the system project 302 to which the design modification 1304 is directed, and further identify other portions of the system project 302 whose functions or responses may be affected by the design modifications. In embodiments in which different developers or groups of developers have been assigned to work on respective different portions or aspects of the system project 302, collaboration management component 210 can also identify the developers or groups who have been assigned to the affected portions of the system project 302, and user interface component 204 can send update notifications 1302 to the development interfaces 1004 associated with these affected portions (e.g., interfaces associated with client devices 504b and 504c in the illustrated example). These update notifications 1302 can include descriptions of the proposed modification 1304, an indication of a possible impact on the recipient's portion of the project 302, or other such information. In some embodiments, collaboration management component 210 may be configured to integrate the proposed design modification 1304 into the system project 302 only if all notification recipients submit an approval for the design modification, based on their own determinations that the proposed modification will not adversely affect their portions of the system project 302.

In some embodiments, collaboration management component 210 can also be configured to track and record each developer's design contributions to the system project 302. This information can be used for auditing purposes, to track developer productivity, to identify originators of specific design contributions, or for other purposes.

Collaboration management component 210 can also be configured to share development notes submitted by the various developers via user interface component 204. These development notes can be submitted as part of the design input 512 and attached to specified portions of the system project 302 (e.g., a control code segment, a device configuration parameter setting, an engineering drawing element, etc.), such that when other developers view a portion of the system project 302 to which another developer has attached a development note, the development note can be selectively viewed. In some embodiments, elements of the system project 302 to which a development note has been attached can be represented as a selectable icon located on or near the corresponding project element, and selection of the icon can render the note for viewing.

Figure 14:
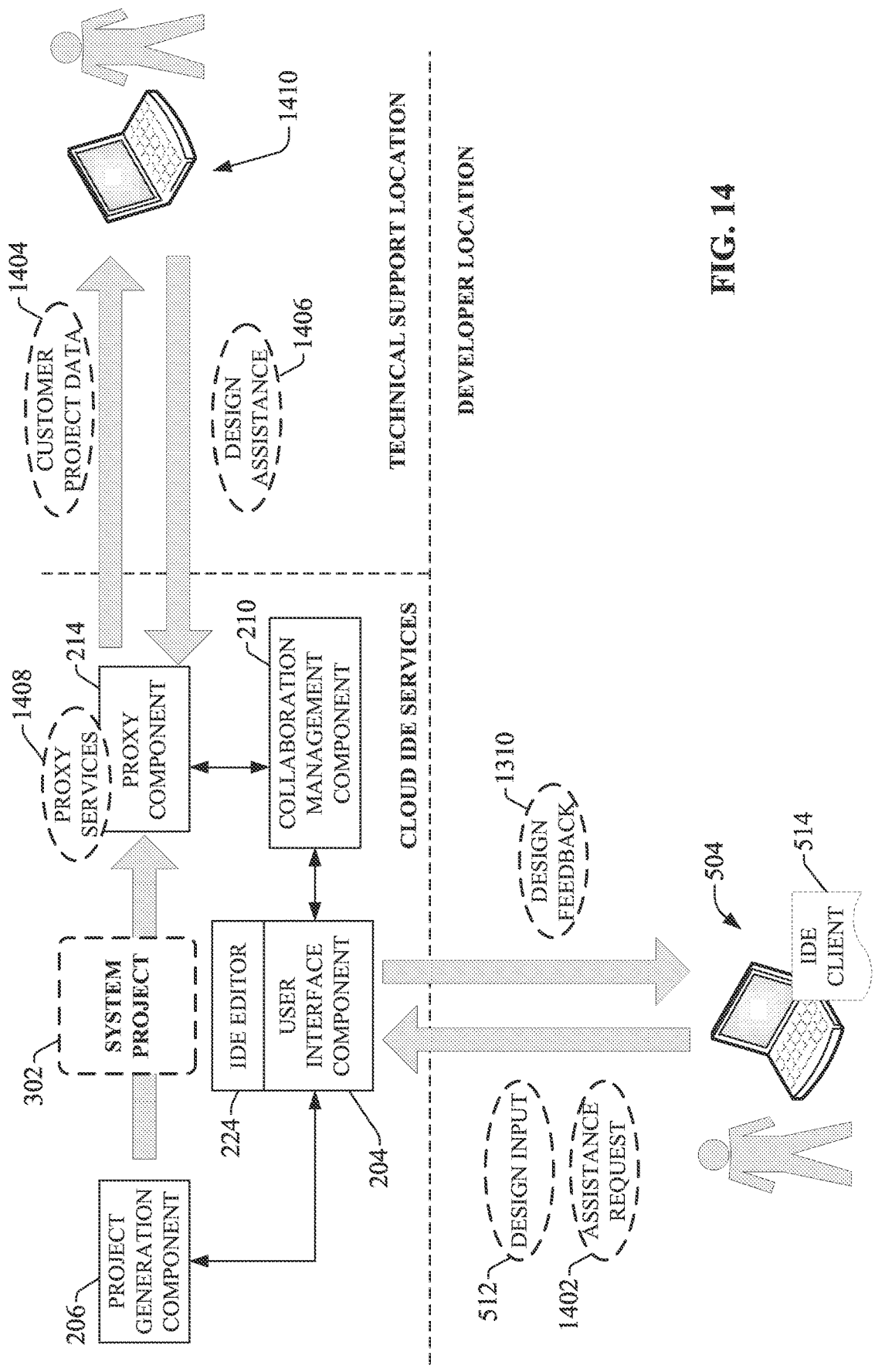
FIG. 14 is a diagram illustrating the use of IDE services as a proxy between a plant-based project developer and remote technical support personnel.

In some embodiments, the collaborative editing environment supported by the industrial IDE system can also encompass access to project development experts in real-time during design. FIG. 14 is a diagram illustrating the use of IDE services as a proxy between a plant-based project developer and remote technical support personnel. In this embodiment, industrial IDE services 802 include associated proxy services 1308 (implemented by proxy component 214) that manage connectivity and data exchange between a developer's client device 504 and remote technical support. In cloud-based implementations, each end user's system project 302 (e.g., a completed system project 302 for an automation system currently in operation or a pending system project 302 in development for an automation system to be commissioned) is securely maintained on the cloud platform. Proxy services 1308 can permit authorized technical support personnel (associated with client device 1310) to access some or all of a given customer's system project data using the IDE services 802 to proxy into the customer's data. The technical support entity may be, for example, an administrator of the IDE services 802, an OEM who manufactures a machine for which control programming is being developed, a system integrator, an equipment vendor, or another such entity. In some embodiments, the end user can selectively permit access to a selected subset of their system project data, while prohibiting access to other portions of their system project 302 from the technical support personnel, thereby protecting sensitive or proprietary project information.

In an example scenario, project generation component 206 can infer, based on analysis of design input 512 and the system project 302 as a whole, the designer's current design goal (e.g., programming a particular automation function, setting configuration parameter values for a particular type of industrial device in connection with performing an automation function, etc.). Based on this inference of the user's design intentions, collaboration management component 210 can initiate—via proxy component 214—a communication channel to a live or automated expert capable of assisting with the design goal.

In some embodiments, the IDE system 202 can establish connectivity with the expert automatically in response to an inference that the developer is experiencing difficulty in developing a portion of the system project 302 relating to the design goal. Alternatively, the IDE development interface can include controls that allow the end user to submit an assistance request 1402 that initiates collaboration with the expert. The assistance request 1402 may specify a particular aspect of the system project 302 for which assistance is required (e.g., a control code routine, a visualization screen, device selection or compatibility, configuration of a specified industrial device, etc.). In some embodiments, proxy component 214 may perform additional processing on the assistance request 1402 prior to sending a request to a remote support representative. Proxy component 214 can perform this additional processing based in part on previously captured knowledge of the end user's automation system in development, or the customer's larger plant facility. For example, proxy component 214 can glean additional customer-specific context that may assist in solving the design problem for which assistance is being requested. Such context may include additional information about the devices and/or machines that make up the automation system for which the system project 302 is being developed (e.g., identities of such devices, as well as their role in the overall industrial system and their functional relationships to one another), other upstream or downstream processes relative to the automation system being designed, whose operations may have an impact on operation of the new automation system, etc. In response to receipt of the assistance request 1402, proxy component 214 can select an available technical support person determined to be qualified to assist with the request—e.g., based on information stored in competency profiles for respective technical support people indicating each person's level of training, areas of expertise, equipment for which the person has experience, etc.—and open a remote communication channel to the selected technical support person.

Once this communication channel is established, the technical support person can access, view, and modify selected subsets of customer project data 1404 (via customer support client device 1410) obtained from the system project 302. In some embodiments, user interface component 204 can present the expert with a visualization of the designer's code, visualization application development screens, device configuration parameters, or other aspects of system project 302. The technical support person can submit design assistance 1306 in the form of direct modifications to aspects of the end user's system project 302 (e.g., control code rewrites, setting of device configurations, etc.) or design feedback 1312 submitted to the end user recommending certain modifications or otherwise providing design guidance. In some embodiments, the cloud-based IDE system 202 can also serve as a trusted proxy through which technical support personnel can remotely access equipment at the end user's plant facility; e.g., for the purposes of remotely configuring the user's devices, viewing or modifying control programming on an industrial controller or visualization screens on an HMI terminal, etc.

Figure 15:
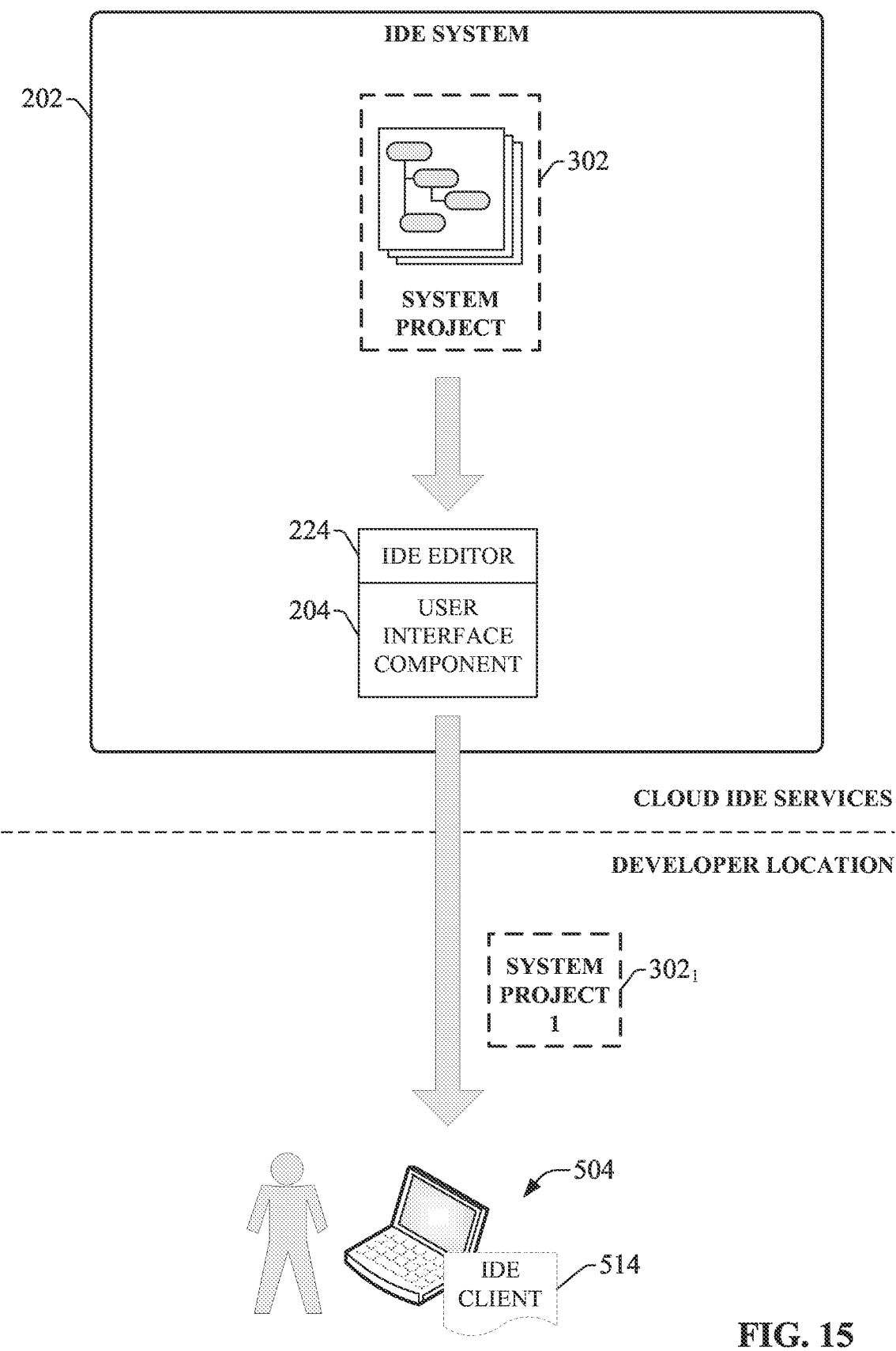
FIG. 15 is a diagram illustrating downloading of a copy of system project from and IDE system to a local client device.

Although examples described above depict an architecture in which a common version of the system project 302 is maintained by the cloud-based IDE system 202 and different collaborative developers are permitted to work on this common version of the system project 302 in a synchronous manner by accessing the cloud-based IDE services 802, some embodiments of IDE system 202 can also support asynchronous collaborative project development by allowing developers to modify local versions of the system project 302 and submit the resulting design changes to the master version of system project 302 residing on the cloud platform. FIG. 15 is a diagram illustrating downloading of a copy of system project 302 from IDE system 202 to a local client device 504. In this example, client device 504 executes an IDE client 514 that allows the client device 504 to access the IDE system's project development tools and environment. The IDE client 514 can be served to the client device 504 by the IDE system 202 or may be a client application installed on client device 504 and configured to interface with the IDE system 202. A user can interact with the IDE client 514 to copy a version $302_1$ of system project 302 from the cloud-based IDE system 202 to the client device's local storage for local viewing and development. The master copy of the system project 302 is maintained on the IDE system 202 after the local version $302_1$ has been copied.

Once copied to the client device 504, a developer can view and edit the local version $302_1$ using project development tools supported by the IDE client 514. At least some of these development tools can be similar to those supported by the IDE system 202 described above (see, e.g., FIG. 5). For example, some embodiments of IDE client 514 can support the use of design guardrails to ensure that local edits made to the local version $302_1$ of the project—e.g., control program changes, HMI modifications, changes to device configuration parameters, modifications to automation objects, etc.—comply with internal or external design standards. As in previous examples, various embodiments of IDE client 514 can allow the user to submit edits to the local version $302_1$ of the project as one or more of control programming (e.g., ladder logic, DLS programming, sequential function charts, structured text, function block diagrams, etc.), design changes to visualization applications such as HMIs (e.g., addition, removal, or relocation of graphical objects), industrial device configuration parameter values, or other such design input.

Figure 16:
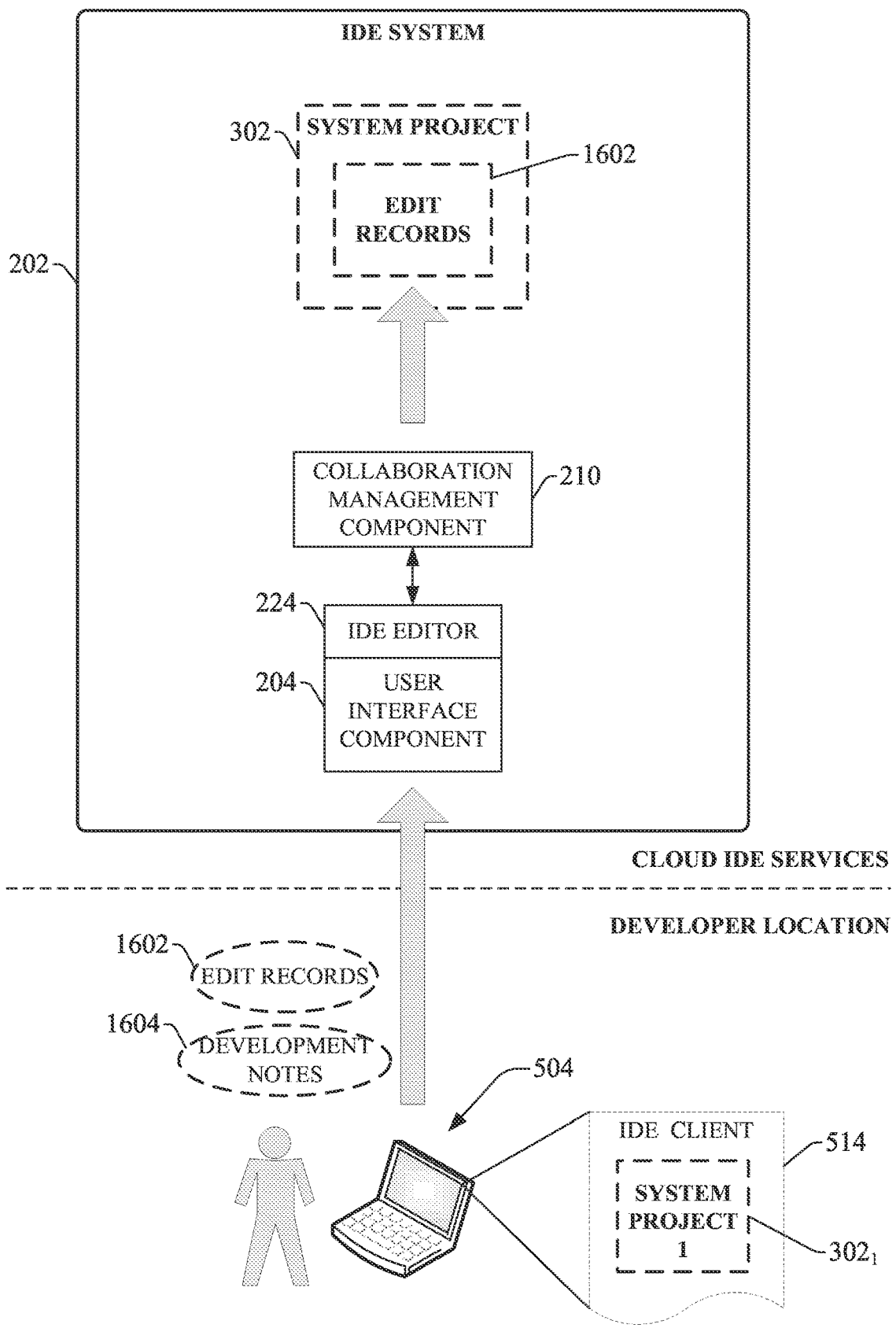
FIG. 16 is a diagram illustrating synchronization of local project edits to an IDE system.

When a developer implements edits on a locally stored version $302_1$ of the system project 302, the developer can choose to synchronize a record of these edits to the IDE system 202 in association with the system project 302. FIG. 16 is a diagram illustrating synchronization of local project edits to the IDE system 202. In this example, the developer implements modifications to the local version $302_1$ of system project 302 by interacting with a development environment generated by IDE client 514 on client device 504. As noted above, these modifications can include control program modifications, modifications to a visualization application, modifications to device configuration parameters, or other such edits. In some embodiments, the development tools used to edit the local version $302_1$ can be entirely local to the client device and supported by the IDE client 514. Alternatively, in some embodiments, the IDE client 514 may afford access to one or more of the development tools provided by the IDE system 202 (e.g., the development tools described above), and can allow the developer to implement localized changes to the local version $302_1$ of system project 302 using these development tools. In either case, the IDE client 514 can apply any suitable design guardrails to the project edits submitted by the developer to ensure that the modified local version $302_1$ of the system project 302 complies with internal design standards defined by the industrial enterprise or external design standards applicable to the industrial vertical for which the system project 302 is being developed.

Upon completion of these local edits, the developer can submit a record of the project modifications to the IDE system 202 as edit records 1602. In some embodiments, edit records 1602 can be submitted by the IDE client 514 in response to appropriate interaction with a synchronization control of the IDE client's development interface. Edit records 1602 can represent an audit or log of the user's modifications to the local version $302_1$ of system project 302. As will be described in more detail below, edit records 1602 can record the modification history of the local version $302_1$ in a granular format that allows the IDE system 202 to selectively apply individual edits from the user's edit history to the master version of the system project 302 residing on the cloud platform. For example, an edit record 1602 may comprise a difference record that identifies differences between the master version of system project 302 stored on the IDE system 202 and the modified local version $302_1$.

In some embodiments, the IDE system 202 can also allow the developer to submit development notes 1604 together with the edit records 1602. The development notes 1604 can be written to provide supplemental information about the submitted edits; e.g., the reasons for the project modifications, an identity of a particular automation system installation for which the modifications are designed, conditions under which the modifications are appropriate, etc. In general, the development notes 1604 can be used to convey information that may be useful to other developers who are working on the same system project 302. Also, in some embodiments, the collaboration management component 210 can also be configured to leverage information contained in the development notes 1604 in connection with merging one or more of the edits defined by the edit records 1602 into the master version of the system project 302, or brokering between edits received from different developers, as will be described in more detail below.

Upon submission of edit records 1602, the collaboration management component 210 can initiate the process of integrating the edits defined by the edit records 1602 into the master version of the system project 302. In some embodiments, collaboration management component 210 can regulate or manage integration of edit records 1602 into the master version of system project 302 in view of various project editing rules, conflict resolution rules, or other such edit criteria or permissives. Some of these editing rules may be defined by a project administrator (e.g., a lead engineer or developer) and can be enforced by the collaboration management component 210 when new edit records 1602 are received.

Figure 17:
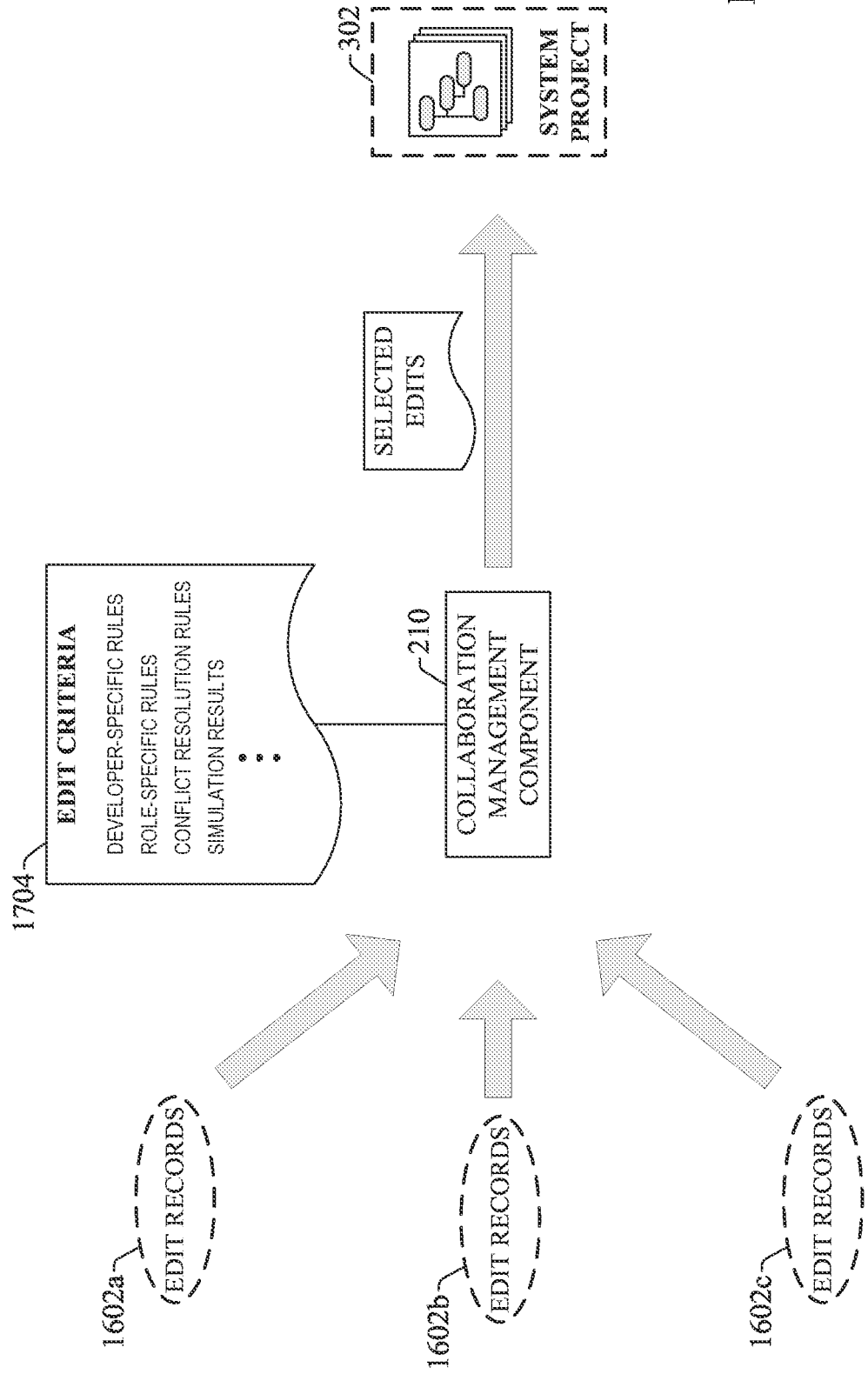
FIG. 17 is a diagram illustrating selective and regulated synchronization of locally implemented edit records into a system project.

FIG. 17 is a diagram illustrating selective and regulated synchronization of locally implemented edit records 1602 into a system project 302 according to one or more embodiments. As noted above, a number of edit criteria 1704 can be defined and stored on the IDE system 202 and made available to the collaboration management component 210 in connection with synchronizing edit records 1602 with the master version of system project 302. In some implementations in which the IDE system 202 executes on a cloud platform as a set of services made available to multiple different customer entities, the IDE system 202 can allow each customer entity to define customized edit criteria 1704 according to the customer's requirements, in-house editing standards, developer hierarchy, division of development tasks, or other such personalized requirements. These customer-specific sets of edit criteria 1704 are stored and applied separately such that the IDE system 202 only applies a given set of customer-specific edit criteria 1704 to edits directed to a system project 302 associated with the corresponding customer. Other sets of edit criteria 1704 can be made globally applicable to all customers. These globally applicable editing rules can include, for example, analytic rules for resolving conflicts between competing project edits directed to the same portion of system project 302 based on globally applicable quality metrics (e.g., least amount of code, least expected machine stress, best coding practices, least expected energy consumption, etc.).

Some editing criteria 1704 can be specific to individual developers or developer roles. For example, in some project development scenarios a given developer may only be permitted to edit certain aspects of system project 302, such as specified control program routines relating to a particular machine, production area, or facility. In another scenario, a developer may only be permitted to develop and edit engineering drawings but may be prohibited from editing other aspects of the system project (e.g., control programs, HMI screens, device configuration settings, etc.). In such scenarios, these developer-specific rules can be defined and stored on the IDE system 202 as part of edit criteria 1704 and applied by the collaboration management component 210 when a new edit record 1602 is received. Upon receipt of an edit record 1602 that includes an edit directed to an aspect of the system project 302 (e.g., a routine of a control program, a drawing, a device configuration, etc.), the collaboration management component 210 can identify the developer who submitted the edit record 1602—e.g., based on the user credentials associated with the IDE client 514 that submitted the edit record—and cross-reference the identity of the developer with the edit criteria 1704 to determine whether the developer is permitted to perform edits on the relevant aspect of the system project 302. Collaboration management component 210 will only integrate the edit with the system project 302 if the edit criteria 1704 indicates that the developer is permitted to alter that aspect of the system project 302, and if the submitted edits do not violate other defined edit criteria 1704. Alternatively, if the user is denied editing privileges to the aspect of the system project 302 to which the edits are directed, the collaboration management component 210 will reject the edits, and the user interface component 204 can send a notification to the developer's IDE client 514 indicating that the developer's edits have been rejected. This notification can also state the reason that the submitted edit was rejected; e.g., by identifying the editing rule used as the basis for the rejection.

Some embodiments of collaboration management component 210 can support definition of edit criteria 1704 directed to a specified developer role rather than to a specific developer. This can allow edit permissives to be collectively defined for groups of developers assigned to respective defined developer roles. Example roles for which role-specific edit criteria 1704 can be defined can include, for example, controls engineers, mechanical engineers, information technology (IT) engineers, project managers, or other such roles. IDE system 202 can allow separate sets of edit criteria 1704 to be defined for respective developer roles, and collaboration management component 210 will apply each set of edit criteria 1704 to edit records 1602 received from developers assigned to the corresponding developer role. This feature can also be used to define deferential criteria for application of edit records 1602; e.g., such that conflicts between edit records 1602 directed to the same aspect of the system project 302 by different developers can be resolved, at least in part, based on the respective roles of the developers (e.g., by prioritizing edit records 1602 received from a lead developer or another supervisory role).

Figure 18:
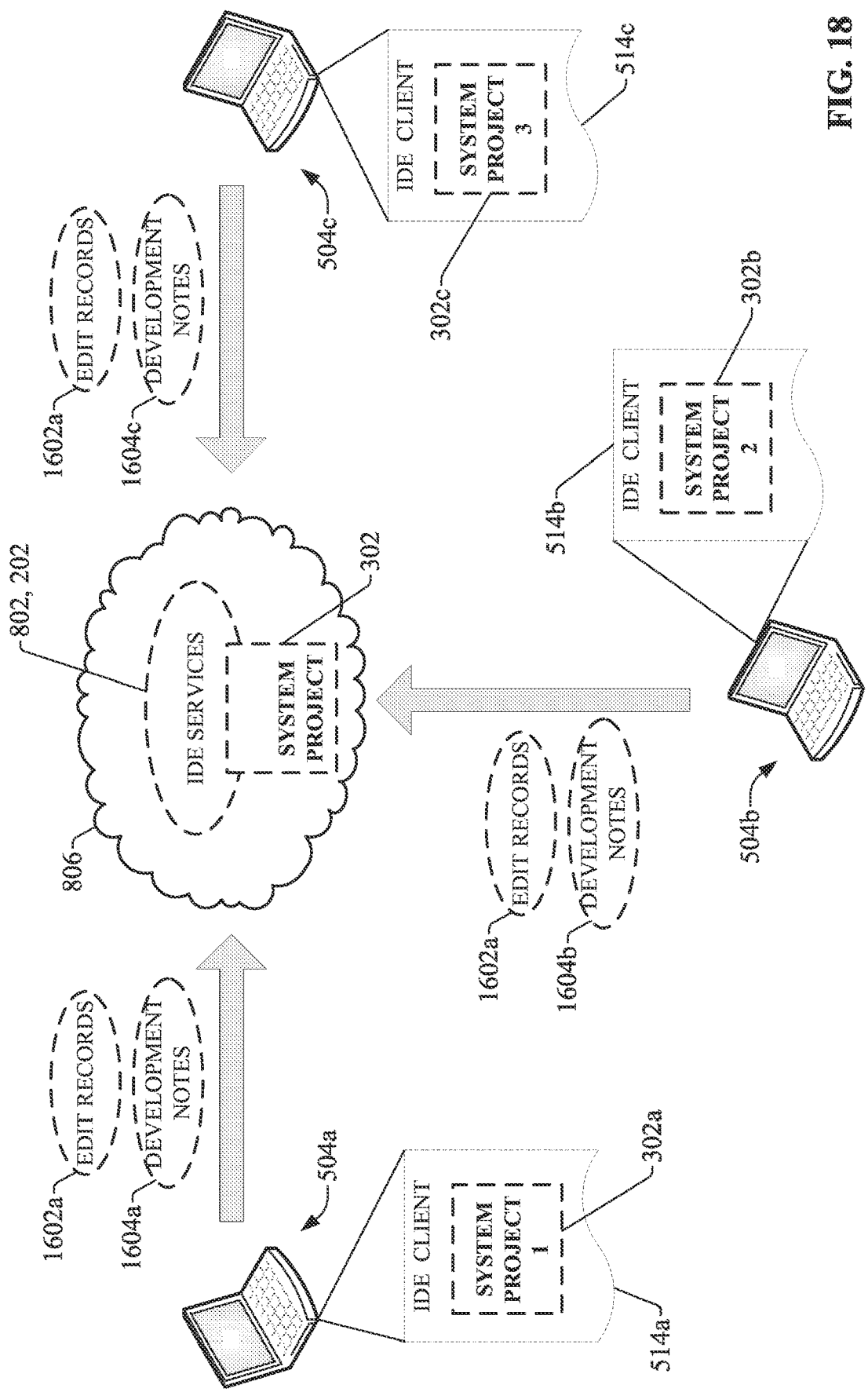
FIG. 18 is a diagram illustrating the use of cloud-based IDE system to perform asynchronous development of a system project.

In a collaborative development scenario, multiple developers may possess, and perform development on, respective locally stored versions of the system project 302, and submit records of these edits to the master version of the system project 302 in an asynchronous manner. FIG. 18 is a diagram illustrating the use of cloud-based IDE system 202 (or IDE services 802) to perform asynchronous development of a system project 302. In contrast to the scenario described above in connection with FIGS. 9-11, in which multiple collaborative developers perform synchronous development of the master copy of system project 302 by leveraging the centralized IDE services 802 to submit design input 512 directly to the cloud-based version of system project 302 (e.g., using customized development platform interfaces 1004a-1004c served to the client devices 504 by the IDE services 802), FIG. 18 depicts a scenario in which multiple developers perform local edits on locally stored versions of the system project 302a-302c, and submit edit records 1602a-1602c defining the edits (and any development notes 1604a-1604c the developers wish to associate with the edits) to the cloud-based IDE system 202 for integration into the master version of system project 302.

As in the synchronous development scenario, the collaboration management component 210 can manage and regulate these diverse sets of edit records 1602a-1602c based on edit criteria 1704 to ensure consistency and optimization of the system project 302. In addition to the developer- and role-specific rules discussed above, this can include application of conflict resolution rules (defined as part of edit criteria 1704) to broker between edit records 1602a-1602c from different developers that are directed to the same portion of the system project 302 and which are mutually exclusive or otherwise in conflict with each other (e.g., alternative versions of a control program routine, alternative versions of a custom automation object, conflicting drawing edits, conflicting device configuration parameter settings, etc.).

With regard to edit records 1602 defining conflicting versions of control programming included in the system project 302, collaboration management component 210 can apply any of the brokering or selection criteria discussed above in connection with FIG. 11 to the edit records 1602, and select an edit record 1602 from among the candidate edit records 1602a-1602c for integration into the master version of the system project 302 based on these selection criteria. For example, referring again to FIG. 17, if multiple edit records 1602 are received that are directed to the same portion of control code defined in system project 302 and which are in conflict with one another, collaboration management component 210 can identify and select the edit that is predicted to perform the same control function with the least lines of code, and integrate this edit into the master version of system project 302. In another example, collaboration management component 210 may select the edit that is estimated to control its associated mechanical asset with the least stress on the machinery. As in the case of synchronous edits, estimations of the amount of stress applied to the controlled industrial assets can be determined by the collaboration management component 210 based on an analysis of the respective versions of the control code that will result from implementing the respective edit records 1602a-1602c, and these estimations can be based on built-in industrial expertise regarding how the respective control sequences will affect the mechanical assets.

Other code selection criteria that can be applied to conflicting edit records 1602a-1602c by the collaboration management component 210 can include, but are not limited to, the edit expected to cause the automation system to consume the least amount of energy, the edit expected to yield the greatest product output, the edit expected to cause the controlled machinery to experience the least amount of downtime, or other such criteria.

Although the foregoing examples discuss brokering between edit records 1602a-1602c that are directed to control programming defined as part of the system project 302, embodiments of collaboration management component 210 can apply similar selection criteria to edit records directed to other aspects of the system project 302, including but not limited to drawing modifications, device configuration parameter settings (e.g., motor drive settings), HMI screen edits, or other such aspects of the system projects.

As in the synchronous development scenario, collaboration management component 210 can also leverage simulation component 212 in connection with assessing the respective different candidate edit records 1602a-1602c. In this regard, simulation component 212 can be configured to simulate control of an automation system (or a portion thereof) by the respective versions of the control code that would result from implementation of the respective edit records 1602a-1602c, and provide results of the simulations to the collaboration management component 210, which can then select the edit record 1602 that yields a preferred version of the code based on these results. Any of the example types of assessment analyses described above may be performed using control simulations carried out by the simulation component 212. In some embodiments, simulation component 212 can leverage a digital model of the automation system for which system project 302 is being developed in connection with simulating the different versions of the control code that would result from implementing the respective edit records 1602a-1602c.

Some embodiments of simulation component 212 can also perform risk analyses on the received edit records 1602a-1602c to determine possible ramifications of integrating the edit records 1602a-1602c into the master version of the system project 302. In such embodiments, the collaboration management component 210 will only integrate the edits defined by an edit record 1602 if results of the risk analysis applied to those edits do not indicate risk concerns. As part of this risk assessment, simulation component 212 may perform a regression analysis on the system project 302 as a whole to determine which other aspects of the system project 302 are likely to be affected by the proposed modification, and use simulation techniques or other types of analysis to determine how the update will affect performance of these other related aspects.

Since developers working asynchronously on a common system project 302 as depicted in FIG. 18 are likely to submit their respective edit records 1602 at different times, collaboration management component 210 can be configured to store edit records 1602 in association with the system project 302 when those edit records 1602 are received, and perform subsequent brokering analysis on one or more of these edit records 1602 when a new edit record 1602 is received that conflicts with a previously received and integrated edit record 1602.

Figure 19:
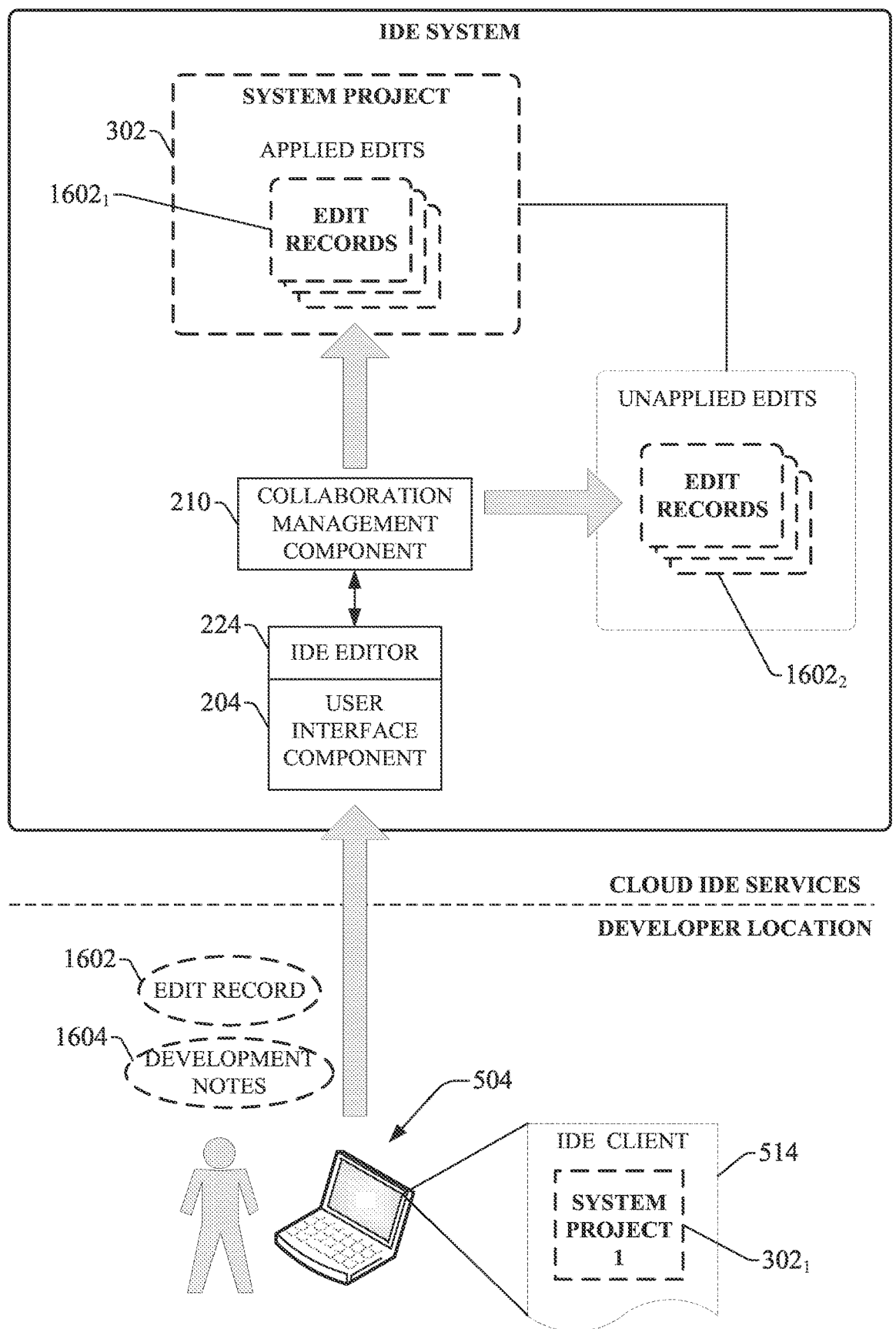
FIG. 19 is a diagram illustrating storage of both applied edit records and unapplied edit records in association with a system project.

FIG. 19 is a diagram illustrating storage of both applied edit records 1602$_1$ and unapplied edit records 1602$_2$ in association with a system project 302. As discussed above, when a new edit record 1602 representing one or more edits implemented on a locally stored version 302$_1$ of the system project 302 is received from a client device 504, collaboration management component 210 will assess the edit record in view of edit criteria 1704 as discussed above, and either apply the edit to the system project 302 as an applied edit record 1602$_1$ if the edit satisfies the edit criteria 1704, or reject the edit if the edit criteria 1704 is not satisfied. Edit records 1602$_2$ that have been submitted to the system project 302 but rejected by the collaboration management component 210 are nevertheless stored in associated with the system project 302 in order to maintain a log of all edit records 1602 that have been submitted to the project, regardless of whether those edits have been integrated into the system project 302. As will be discussed in more detail below, both applied edit records 1602$_1$ and unapplied edit records 1602$_2$ can be browsed and viewed by authorized users via user interface component 204. Moreover, if desired, users can selectively apply previously unapplied edit records 1602$_2$ to the system project 302, overriding the IDE system's previous decision to reject the edits associated with those records.

When a new edit record 1602 is received from a client device 504 associated with a first developer and satisfies all other edit criteria 1704 (e.g., developer- or role-specific criteria), collaboration management component 210 can then make a determination as to whether the new edit record 1602 conflicts with a previously applied edit record 1602$_1$ that had been submitted by another developer. For example, the collaboration management component 210 may determine that the new edit record 1602 comprises edits to a control routine of the system project 302 that conflict with an edit record 1602$_1$ that was submitted by another developer and previously applied to the same control routine. In another example, the collaboration management component 210 may determine that the newly submitted edit record 1602 comprises a change to a device configuration setting that conflicts with a previous setting submitted by another developer. In some embodiments, collaboration management component 210 will only assess the currently applied edit records 1602$_1$ for conflicts with the newly received edit record 1602, without assessing the unapplied edit records 1602$_2$ that have not be integrated into the system project 302.

If the collaboration management component 210 finds no conflicts between the submitted edit record 1602 and any previously applied edit records 1602$_1$, and the submitted edit record otherwise satisfies the other defined edit criteria 1704, the collaboration management component 210 applies the edits defined by the submitted edit record 1602 (reflecting the local edits performed by the developer on the locally stored version 302$_1$ of the system project 302) to the master version of the system project 302. Alternatively, if the submitted edit record 1602 conflicts with a previously applied edit record 16021, the collaboration management component 210 will apply conflict resolution rules (defined as part of edit criteria 1704) to the conflicting edit records 1602 to either select one of the two edit records 1602 whose edits are to be applied to the relevant portion of the system project 302 or to determine a merging strategy for merging the two sets of edits in a manner that mitigates the conflict.

The conflict resolution rules can include any of the brokering criteria discussed above in connection with FIG. 11 (e.g., selecting the edits that are predicted to perform the same function with the least amount of code; selecting the edits that are predicted to minimize machine stress, machine downtime, or energy consumption; etc.). Collaboration management component 210 can also leverage simulation component 212 to execute simulations of system operation under different design scenarios represented by the competing edit records 1602, and select which of the conflicting edit records 1602 is to be integrated based on results of the simulations, as discussed in previous examples.

If, based on application of the conflict resolution rules, the newly submitted edit record 1602 is determined to be preferable to the currently applied edit record 1602$_1$, collaboration management component 210 can roll back or undo the currently applied edit record 1602$_1$, and update the system project 302 to incorporate the edits defined by the newly submitted edit record 1602. The previously applied edit record 1602$_1$ is then redesignated as an unapplied edit record 1602$_2$, but still maintained on the IDE system 202 in association with the system project 302.

In some scenarios, rather than performing a binary selection between the two conflicting edit records, the collaboration management component 210 can identify a strategy for merging the two conflicting edits in a manner that is expected to optimize performance of the system project 302 while mitigating conflicts. This may involve, for example, selecting subsets of edits from each of the conflicting edit records 1602 in a granular manner and applying these selected edits to the system project 302. The subsets of edits can be selected by the collaboration management component 210 based on an optimization analysis that identifies complimentary (non-conflicting) subsets of edits from the two or more conflicting edit records 1602 that, if implemented in the system project 302, are expected to yield an optimal performance outcome (e.g., an outcome that better satisfies a defined performance metric than would be the case if only the edits of one of the two competing edit records 1602 were implemented).

If a previously applied edit record 1602$_1$ is supplanted—in whole or in part—by a subsequently received edit record 1602 directed to the same portion of the system project 320, the user interface component 204 can generate and send a notification to the developer of the originally applied edit record 1602$_1$, notifying the developer that his or her edit has been superseded by another edit. This notification can be delivered to the original developer's client device 504, and can include information about the new edits that have replaced the developer's original edits, including but not limited to the identity of the developer whose edits have replaced the previously applied edit record 1602$_1$, a list of the differences between the previously applied edits and the new edits (e.g., identification of a new device configuration setting value relative to the previous value, an explanation of how a section of control code has been modified or added, etc.), any development notes 1604 that were submitted together with the new edit record 1602, or other such information.

Also, notifications can be sent to developers assigned to work on other portions of the system project 302 if the collaboration management component 210 determines that the edits made to the system project 302 by the newly applied edit record 1602 will affect those other portions of the system project 302. As in the example described above in connection with FIG. 13, application of a new edit record 1602 to the system project 302 can initiate a regression analysis on the system project 302 to identify other portions of the system project 302 that may be affected by the application of the new edit record 1602; e.g., based on learned interdependencies across the system project such as programmatic relationships or dependencies between control code segments or routines, dependencies between control code segments and visualization elements, dependencies between control code and engineering drawings (e.g., I/O drawings, electrical drawings, panel layout drawings, etc.), or other such relationships. Based on these learned interdependencies, collaboration management component 210 can identify other portions of the system project 302 whose functions or responses may be affected by application of the new edit record 1602. The collaboration management component 210 can also identify the developers or groups who have been assigned to the affected portions of the system project 302, and user interface component 204 can send notifications to the IDE clients 514 associated with these developers. These notifications—similar to update notifications 1302 illustrated in FIG. 13—can include descriptions of the edits applied by the new edit record 1602, an indication of a possible impact on the recipient's portion of the project 302, or other such information. In some embodiments, collaboration management component 210 may be configured to integrate the new edit record 1602 into the system project 302 only if all notification recipients submit an approval for the new edits, based on their own judgments that the proposed edits will not adversely affect their portions of the system project 302.

Figure 20:
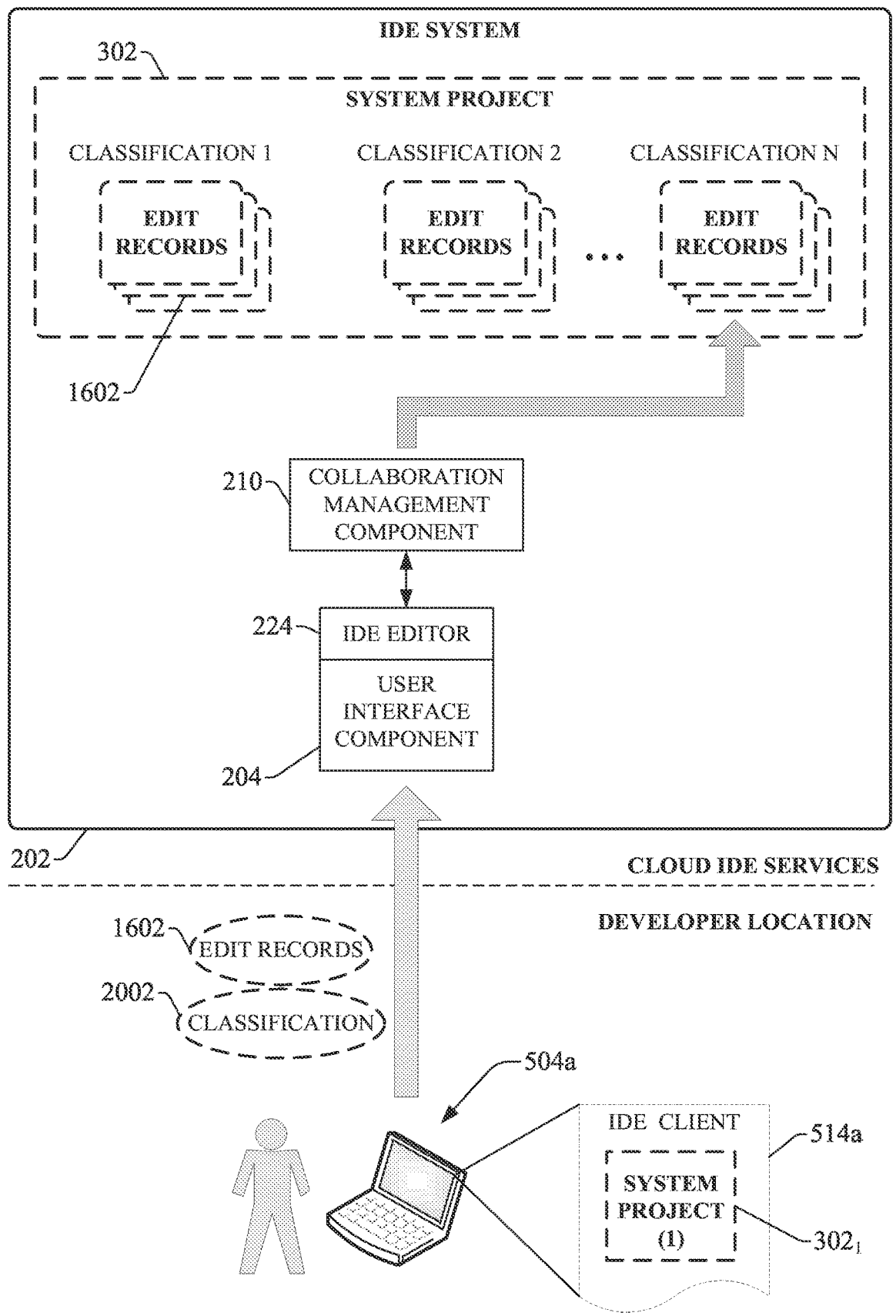
FIG. 20 is a diagram illustrating submission and classification of edit records for a given system project by an IDE system.

In some embodiments, the IDE system 202 can store edit records 1602 submitted by different developers or at different times in a classified manner. The resulting edit classifications can serve as a navigation guide that assists users in locating previously submitted edits for review. FIG. 20 is a diagram illustrating submission and classification of edit records for a given system project 302 by the IDE system 202. In this example, a developer implements edits to a local version $302_1$ of system project 302 on client device 504a executing IDE client 514a, and submits corresponding edit records 1602 to the IDE system 202 which are stored in association with the cloud-based version of system project 302, as described in previous examples. The IDE system 202 stores the edit records 1602 according to different categories or classifications.

The classification under which a given edit record 1602 is stored can depend on a variety of factors in various embodiments. For example, edit records 1602 may be classified according to the identity of the developer who submitted the edits. In another example, a developer may submit an edit record 1602 together with classification data 2002 identifying a classification or category under which the submitted edit record 1602 should be stored. Such user-defined classifications may include, for example, an identity of a particular automation system installation (or type of installation) for which the edits were made, an identity of an industrial facility that houses the automation system installation for which the edits were made, an identity of a problem or installation constraint that the edits are intended to address (e.g., the use of an industrial device from a specified alternative vendor, frequent power outages at a given industrial facility, a constraint on material or part availability, etc.), or other such edit classifications. Collaboration management component 210 can appropriately classify the submitted edit record 1602 based on this classification data 2002.

In some embodiments, IDE system 202 can support a hierarchical classification schema, such that a given set of edit records 1602 can be classified under a hierarchical classification path that traverses multiple hierarchical classifications. For example, the identity of an industrial facility can serve as a parent classification node, under which are defined child classification nodes representing such classifications as an identity of the developer who originated the edits, a problem within the industrial facility to which the edits are directed, an identity of an automation system installation to which the edits are directed, or other such child classifications.

Also, as depicted in FIG. 19, edit records 1602 can also be classified according to whether the edits defined in a given edit record 1602 are currently implemented in the master version of the system project 302, or whether the edit record 1602 was submitted to the IDE system 202 but not integrated into the system project 302 (e.g., because the submitted edit record 1602 did not satisfy the defined edit criteria 1804). In this way, the IDE system 202 maintains an audit of all edit records 1602 submitted to the system project 302 regardless of whether those edits have been synchronized into the project 302. In general, both the applied edit records $1602_1$ and unapplied edit records $1602_2$ can be classified according to similar classification schemas, allowing users to browse both applied and unapplied edits according to similar classification categories. The IDE system 202 maintains these edit records 1602 in a manner that allows unapplied edits to be subsequently applied to the system project 302 if deemed appropriate, or to selective roll-back or undo previously applied edits if desired.

User interface component 204 can allow authorized developers to browse the stored edit records 1602 according to classification within the development environment of the IDE client 514, allowing developers to review edit records that have been submitted to the system project 302 (both applied and unapplied edits). For example, user interface component 204 may allow the user to invoke a display designed to render information about edit records 1602 that have been submitted to the project 302. This display may initially render alpha-numeric icons representing top-level categories of edit records that have been submitted to the system project 302. Selection of one of these categories will either cause the edits corresponding to the selected category to be displayed (if there are no additional child categories below the selected category) or cause one or more child categories under the selected category to be rendered for drill-down discovery of edit records 1602. The user can also opt to filter the edit record information such that only edit records 1602 that have been applied to the system project 302 are displayed, or such that only unapplied edit records 1602 are displayed.

Figure 21:
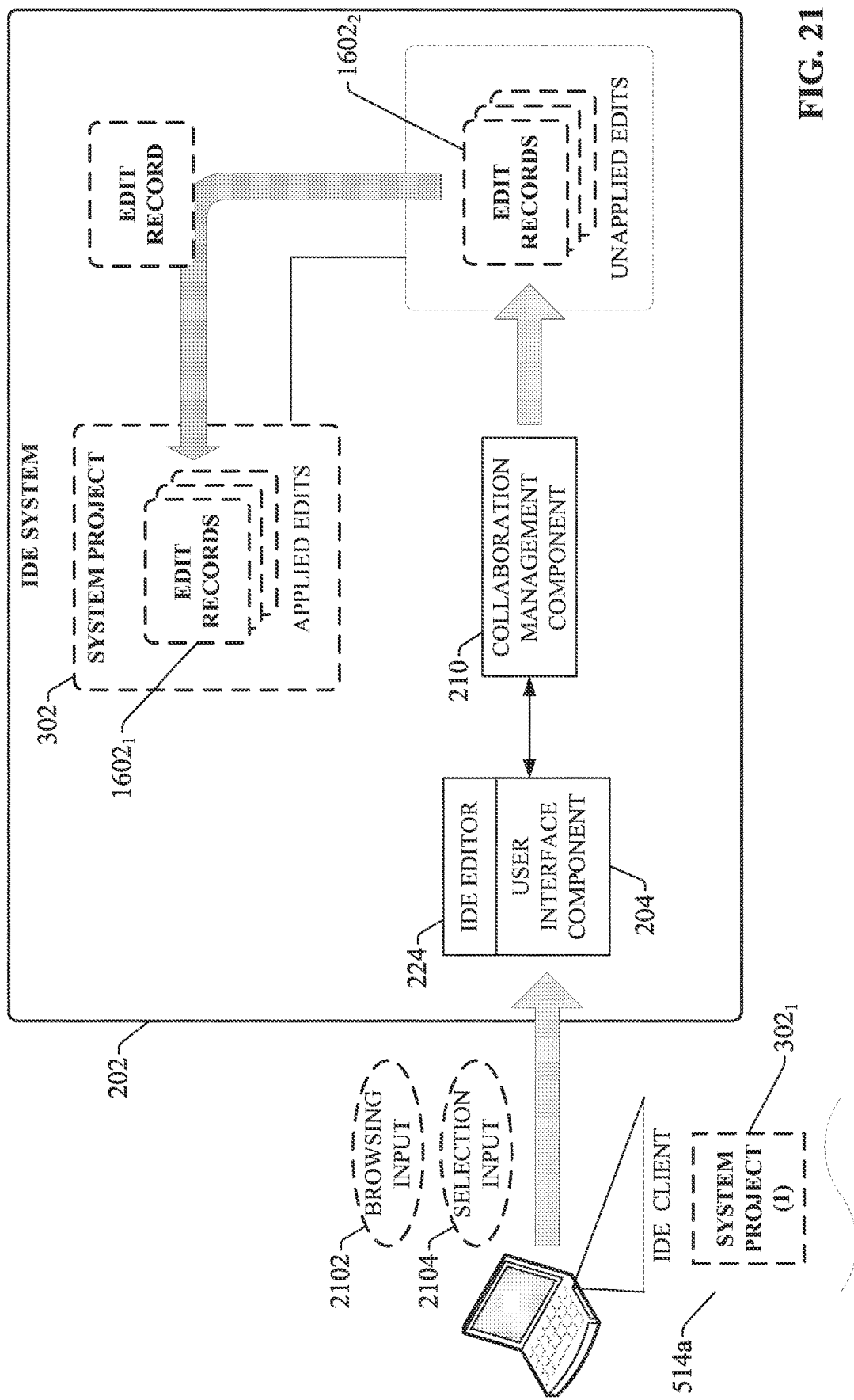
FIG. 21 is a diagram illustrating retroactive application of a previously unapplied edit record to a system project.

Some embodiments of collaboration management component 210 can allow users to manually apply selected unapplied edit records $1602_2$ to the master version of the system project 302, thereby overriding a previous decision by the collaboration management component 210 to reject the submitted edit records $1602_2$. FIG. 21 is a diagram illustrating retroactive application of a previously unapplied edit record $1602_2$ to the system project 302. As noted above, user interface component 204 can render, via the IDE client 514 executing on a user's client device, an edit browsing display interface that allows the user to browse and view unapplied edit records $1602_2$ that are stored in association with the system project 302. In an example embodiment, the edit browsing interface display can render classification categories (e.g., text-based icons or nodes identifying the categories) under which the edit records $1602_2$ are classified, and allow the user to submit browsing input 2102 that navigates these categories in order to locate a desired edit record $1602_2$.

The collaboration management component 210 allows the user to manually apply a selected edit record $1602_2$ to the system project 302 by submitting selection input 2104 identifying the selected edit record $1602_2$, and initiating a command to integrate the edits defined by the selected edit record $1602_2$ into the system project 302. In some scenarios, application of a previously unapplied edit record $1602_2$ in this manner may cause the collaboration management component 210 to roll back a previously applied edit record $1602_1$ that had been selected for integration based on consideration of the edit criteria 1704, and to be replaced by the edits defined by the selected, previously unapplied edit record $1602_2$.

In some embodiments, collaboration management component 210 can be configured to confirm the authorization of the user who is requesting application of the previously unapplied edit record $1602_2$ before allowing the selected edit record $1602_2$ to be applied to the system project 302. This can ensure that the decisions made by the collaboration management component 210 can only be overridden by specified authorized users or user roles. If the user submitting the selection input 2104 is identified by the collaboration management component 210 as a user with override privileges, any of the unapplied edit records $1602_2$ can be selected by the user for integration into the system project 302, even if those edit records $1602_2$ do not comply with the defined edit criteria 1704. This can allow lead developers or other authorized developers to approve application of edit records $1602_2$ that would otherwise be rejected by the collaboration management component 210; e.g., if mitigating circumstances deem such an override necessary.

Since embodiments of IDE system 202 treat submitted project edits as discrete records, and are capable of storing and managing both applied and unapplied edit records 1602, some embodiments of IDE system 202 can also support version control features that allow developers to roll the system project 302 back to a previous version. In an example embodiment, a developer can set a current version of the system project 302 as a milestone version. Returning to FIG. 19, when a current version of a system project 302 is set as a milestone version, the collaboration management component 210 creates a record of the current set of applied edit records $1602_1$. With this milestone version set, developers can continue project development by submitting edit records 1602 to the system project 302. As described in previous examples, submission of edit records 1602 can involve addition of edit records 1602 to the current set of applied edit records $1602_1$, or in some cases may involve supplanting a previously applied edit record $1602_1$ with a subsequently submitted edit record 1602 that is deemed preferable to and incompatible with the previously applied record $1602_1$. In the latter case, the collaboration management component 210 will undo the previously applied edit record $1602_1$ and redesignate this supplanted edit record as an unapplied edit record $1602_2$, maintaining the supplanted edit record in storage with other unapplied edit records $1602_2$.

During this subsequent project development, it may be decided that the system project 302 should be rolled back to the previously indicated milestone version. Accordingly, a developer having appropriate authorization to initiate a project rollback can submit a rollback instruction to the IDE system 202 via the user interface component 204. If multiple milestone versions have previously been set, the user interface component 204 allows the user to select from among the milestone versions as part of the rollback instruction. In response to receipt of this rollback instruction, collaboration management component 210 restores the system project 302 back to the indicated milestone version, as defined by the set of applied edit records $1602_1$ associated with the milestone version. Depending on the subsequent development actions that were performed after the milestone version was set, this rollback process may involve rolling back edit records $1602_1$ that were applied subsequent to creation of the milestone version, and may also involve re-applying one or more unapplied edit records $1602_2$ that had been applied in the milestone version of the project 302 but which had subsequently been removed from the project 302 and redesignated as unapplied records.

In some embodiments, initiation of a rollback to a previous milestone version can be regulated by the collaboration management component 210 such that only authorized developers—e.g., developers having a lead or administrative role—are permitted to initiate a rollback. If a greater degree of collaborative authority is desired, the collaboration management component 210 can be configured to only implement a requested rollback procedure if all developers, or a specified subset of developers, submit approval for the rollback.

Since some rollback procedures may involve rolling back of one or more edit records $1602_1$ that were applied to the system project 302 subsequent to the milestone version, some embodiments of the collaboration management component 210 can also be configured to send notifications to the IDE clients 514 of developers whose applied edit records $1602_1$ have been removed from the project 302 as part of a rollback procedure. These notifications can include an indication of the edit records 1602 that were removed from the system project 302, and may also offer the developer an opportunity to synchronize the resulting milestone version of the system project 302 to the developer's local version $302_1$ if desired.

In some embodiments, when a rollback procedure is performed, the collaboration management component 210 can also create a record of the version of the system project 302 at the time the rollback was initiated. As with creation of a milestone version, this can involve creating a record of the applied edit records $1602_1$ at the time the rollback request was received. Developers can then choose to return to this pre-rollback version of the project 302 if desired using a procedure similar to that used to perform the rollback.

Embodiments of the IDE system 202 that support synchronization of edits performed on locally stored versions of a system project 302 to a master version of the system project 302 maintained on a cloud platform, as described above, can intelligently integrate localized edits performed by multiple developers into a single master version of the project 302, brokering between conflicting edits or merging edits as needed. The system 202 can classify project edits—both applied and unapplied—in a manner that allows the edits to be easily discovered and reviewed by the developers. Also, by recording submitted project edits as discrete records—including both applied and unapplied edits—the IDE system 202 can manage project rollbacks to previous milestone versions by undoing or reapplying edit records as needed in order to return the system project 302 to a specified previous version.

Figure 22A:
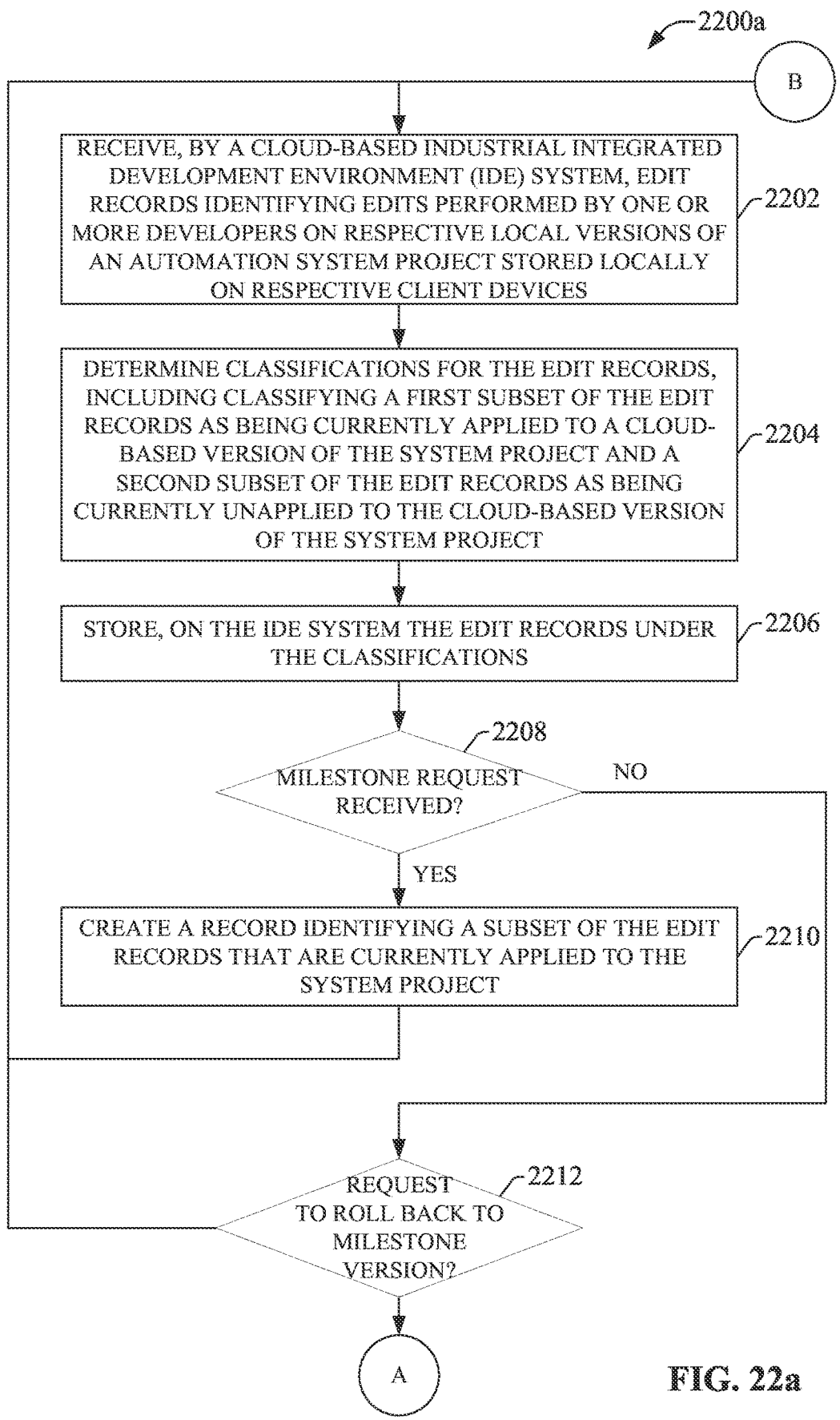
FIG. 22a is a flowchart of a first part of an example methodology for developing an industrial system project stored on a cloud platform in a manner that permits rollback to a milestone version of the project.
Figure 22B:
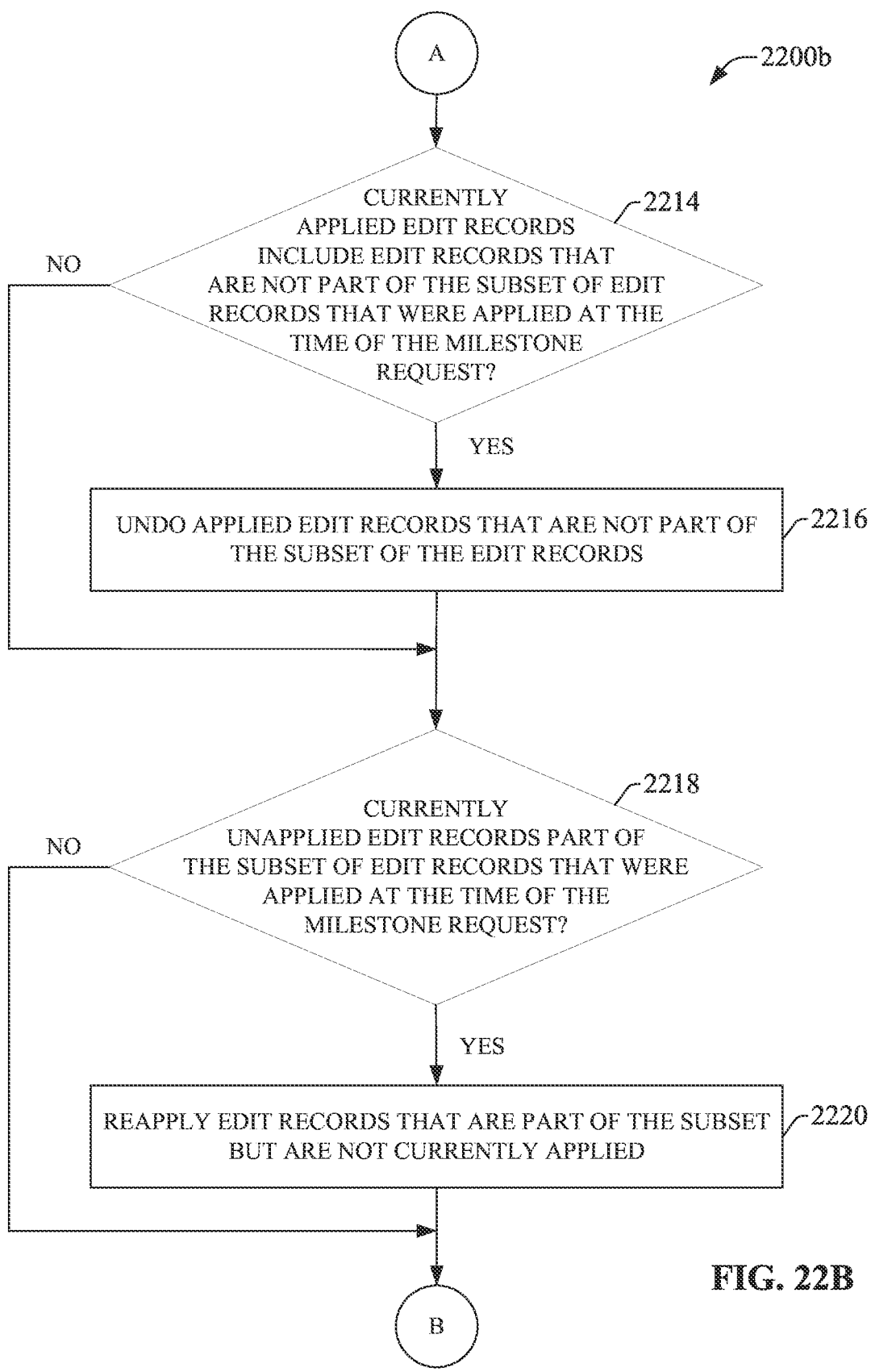
FIG. 22b is a flowchart of a second part of an example methodology for developing an industrial system project stored on a cloud platform in a manner that permits rollback to a milestone version of the project.

FIGS. 22a-22b illustrate an example methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 22a illustrates a first part of an example methodology 2200a for developing an industrial system project stored on a cloud platform in a manner that permits rollback to a milestone version of the project. Initially, at 2202, a cloud-based industrial integrated development environment (IDE) system receives edit records identifying edits performed by one or more developers on respective local versions of an automation system project stored locally on respective client devices. The edit record can be generated by an IDE development platform that executes on the client devices, or is served to the clients devices from the IDE system. The edit records can comprise a record of modifications made to the locally stored versions of the system project. These modifications can comprise, but are not limited to, modifications to an industrial control program (e.g., a ladder logic program or another type of control program), modifications to an HMI application or another type of industrial visualization (e.g., an industrial AR/VR application), modifications to one or more configuration parameters of an industrial device (e.g., an industrial controller, a motor drive, a sensor, an optical safety device, a safety relay, etc.), or other such control project edits.

At 2204, a classification is determined for each edit record received at step 2202. This includes classifying a first subset of the edit records as being currently applied to a cloud-based version of the system project and a second subset of the edit records as being currently unapplied to the system project. In this regard, an edit record may be submitted to the IDE system but not applied to the system project if the edit record conflicts with another edit record that is given priority, or if the edit record is determined to be less optimal than another submitted edit record directed to the same aspect of the system project. Also, some applied edit records may subsequently be redesignated as unapplied records if the project edits represented by those edit records are rolled back or undone during development. At 2206, the edit records are stored on the IDE system under the classifications determined at step 2204.

At 2208, a determination is made as to whether a milestone request is received. This milestone request represents an instruction to flag the present version of the system project as a milestone version. If such a request is received (YES at step 2208), the methodology proceeds to step 2210, where a record is created that identifies a subset of the edit records that are currently applied to the system project. The methodology then returns to step 2202 and development of the system project continues. Alternatively, if no milestone request is received (NO at step 2208), the methodology proceeds to step 2212, where a determination is made as to whether a request to roll back to the milestone version of the system project is received. This request may be received from a developer, or multiple developers in collaboration, wishing to revert the system project back to the version flagged as the milestone version at steps 2208 and 2210. If multiple milestone versions had been flagged during development, the request may include an identity of the desired milestone version.

The methodology then proceeds to the second part 2200b illustrated in FIG. 22b. At 2214, a determination is made as to whether the edit records that are currently applied to the system project include edit records that are not part of the subset of edit records recorded at step 2210, which were those applied at the time that the milestone request was received. If the currently applied edit records include records that were not part of the milestone subset of edit records (YES at step 2214), the methodology proceeds to step 2216, where the currently applied edit records that are not part of the milestone subset of edit records are undone from the system project. The methodology then proceeds to step 2218. If the currently applied edit records do not include records that were not part of the milestone subset of edit records (NO at step 2214), the methodology skips step 2216 and proceeds directly to step 2218.

At 2218, a determination is made as to whether the currently unapplied edit records include edit records that were part of the subset of edit records recorded at step 2210. If so (YES at step 2218), the methodology proceeds to step 2220, where unapplied edit records that were part of the milestone subset of edit records recorded at step 2210 are reapplied to the system project. The methodology the returns to step 2202 and development of the system project continues. If there are no unapplied edit records that were part of the milestone subset of edit records (NO at step 2218), the methodology skips step 2220 and returns directly to step 2202.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 23:
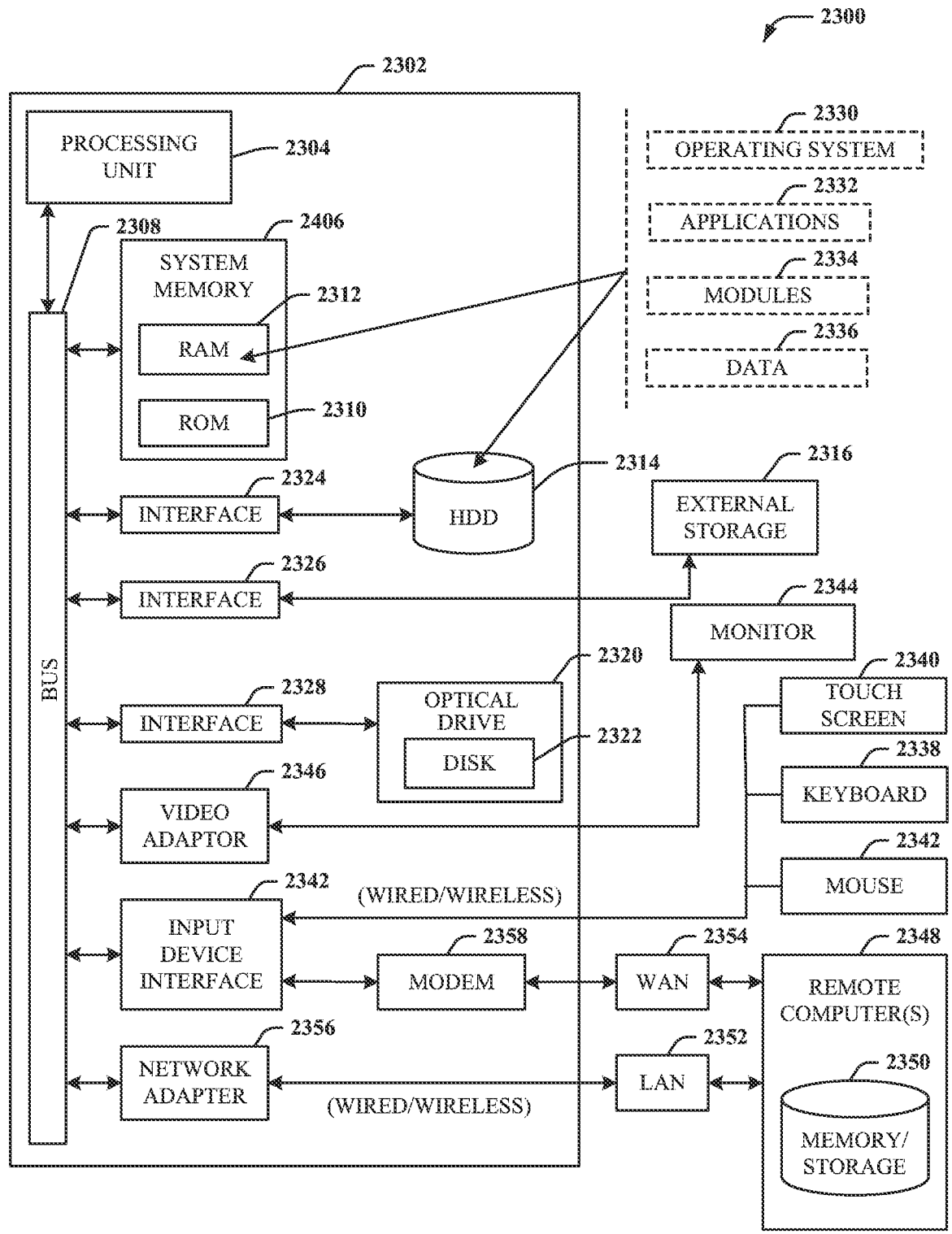
FIG. 23 is an example computing environment.
Figure 24:
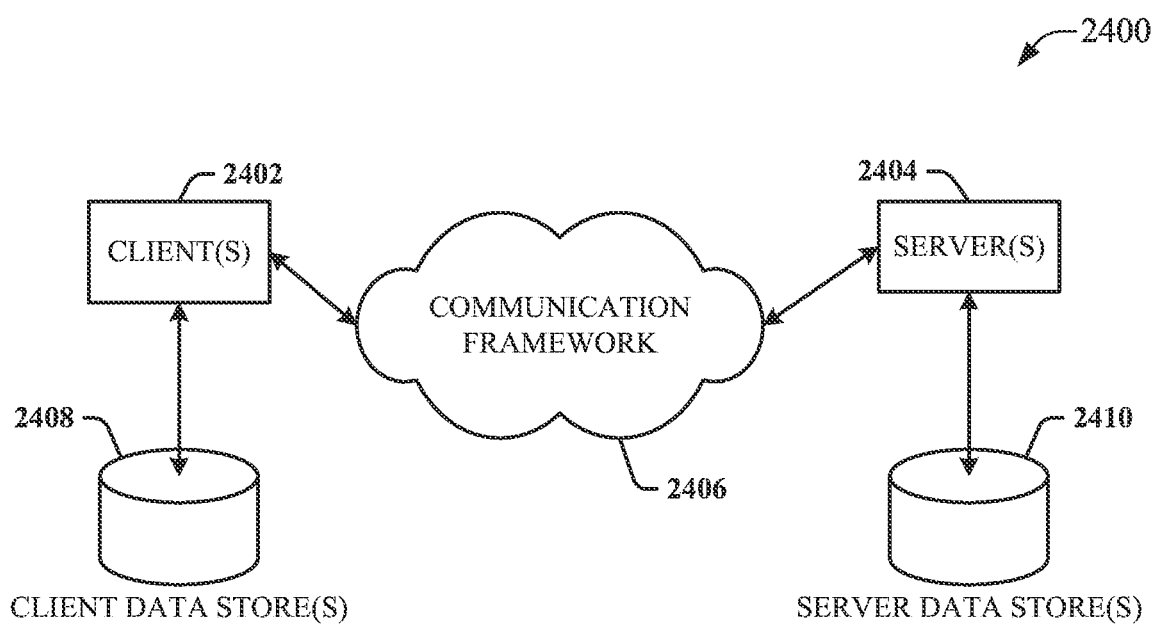
FIG. 24 is an example networking environment.

In order to provide a context for the various aspects of the disclosed subject matter, FIGS. 23 and 24 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 23 the example environment 2300 for implementing various embodiments of the aspects described herein includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi-processor architectures can also be employed as the processing unit 2304.

The system bus 2308 can be any of several types of bus structure that can further interconnect to a memory bus (with or without a memory controller), a peripheral bus, and a local bus using any of a variety of commercially available bus architectures. The system memory 2306 includes ROM 2310 and RAM 2312. A basic input/output system (BIOS) can be stored in a non-volatile memory such as ROM, erasable programmable read only memory (EPROM), EEPROM, which BIOS contains the basic routines that help to transfer information between elements within the computer 2302, such as during startup. The RAM 2312 can also include a high-speed RAM such as static RAM for caching data.

The computer 2302 further includes an internal hard disk drive (HDD) 2314 (e.g., EIDE, SATA), one or more external storage devices 2316 (e.g., a magnetic floppy disk drive (FDD) 2316, a memory stick or flash drive reader, a memory card reader, etc.) and an optical disk drive 2320 (e.g., which can read or write from a CD-ROM disc, a DVD, a BD, etc.). While the internal HDD 2314 is illustrated as located within the computer 2302, the internal HDD 2314 can also be configured for external use in a suitable chassis (not shown). Additionally, while not shown in environment 2300, a solid state drive (SSD) could be used in addition to, or in place of, an HDD 2314. The HDD 2314, external storage device(s) 2316 and optical disk drive 2320 can be connected to the system bus 2308 by an HDD interface 2324, an external storage interface 2326 and an optical drive interface 2328, respectively. The interface 2324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2312, including an operating system 2330, one or more application programs 2332, other program modules 2334 and program data 2336. All or portions of the operating system, applications, modules, and/or data can also be cached in the RAM 2312. The systems and methods described herein can be implemented utilizing various commercially available operating systems or combinations of operating systems.

Computer 2302 can optionally comprise emulation technologies. For example, a hypervisor (not shown) or other intermediary can emulate a hardware environment for operating system 2330, and the emulated hardware can optionally be different from the hardware illustrated in FIG. 23. In such an embodiment, operating system 2330 can comprise one virtual machine (VM) of multiple VMs hosted at computer 2302. Furthermore, operating system 2330 can provide runtime environments, such as the Java runtime environment or the .NET framework, for application programs 2332. Runtime environments are consistent execution environments that allow application programs 2332 to run on any operating system that includes the runtime environment. Similarly, operating system 2330 can support containers, and application programs 2332 can be in the form of containers, which are lightweight, standalone, executable packages of software that include, e.g., code, runtime, system tools, system libraries and settings for an application.

Further, computer 2302 can be enable with a security module, such as a trusted processing module (TPM). For instance with a TPM, boot components hash next in time boot components, and wait for a match of results to secured values, before loading a next boot component. This process can take place at any layer in the code execution stack of computer 2302, e.g., applied at the application execution level or at the operating system (OS) kernel level, thereby enabling security at any level of code execution.

A user can enter commands and information into the computer 2302 through one or more wired/wireless input devices, e.g., a keyboard 2338, a touch screen 2340, and a pointing device, such as a mouse 2342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2304 through an input device interface 2344 that can be coupled to the system bus 2308, but can be connected by other interfaces, such as a parallel port, an IEEE 1394 serial port, a game port, a USB port, an IR interface, a BLUETOOTH® interface, etc.

A monitor 2344 or other type of display device can be also connected to the system bus 2308 via an interface, such as a video adapter 2346. In addition to the monitor 2344, a computer typically includes other peripheral output devices (not shown), such as speakers, printers, etc.

The computer 2302 can operate in a networked environment using logical connections via wired and/or wireless communications to one or more remote computers, such as a remote computer(s) 2348. The remote computer(s) 2348 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2350 is illustrated. The logical connections depicted include wired/wireless connectivity to a local area network (LAN) 2352 and/or larger networks, e.g., a wide area network (WAN) 2354. Such LAN and WAN networking environments are commonplace in offices and companies, and facilitate enterprise-wide computer networks, such as intranets, all of which can connect to a global communications network, e.g., the Internet.

When used in a LAN networking environment, the computer 2302 can be connected to the local network 2352 through a wired and/or wireless communication network interface or adapter 2356. The adapter 2356 can facilitate wired or wireless communication to the LAN 2352, which can also include a wireless access point (AP) disposed thereon for communicating with the adapter 2356 in a wireless mode.

When used in a WAN networking environment, the computer 2302 can include a modem 2358 or can be connected to a communications server on the WAN 2354 via other means for establishing communications over the WAN 2354, such as by way of the Internet. The modem 2358, which can be internal or external and a wired or wireless device, can be connected to the system bus 2308 via the input device interface 2342. In a networked environment, program modules depicted relative to the computer 2302 or portions thereof, can be stored in the remote memory/storage device 2350. It will be appreciated that the network connections shown are example and other means of establishing a communications link between the computers can be used.

When used in either a LAN or WAN networking environment, the computer 2302 can access cloud storage systems or other network-based storage systems in addition to, or in place of, external storage devices 2316 as described above. Generally, a connection between the computer 2302 and a cloud storage system can be established over a LAN 2352 or WAN 2354 e.g., by the adapter 2356 or modem 2358, respectively. Upon connecting the computer 2302 to an associated cloud storage system, the external storage interface 2326 can, with the aid of the adapter 2356 and/or modem 2358, manage storage provided by the cloud storage system as it would other types of external storage. For instance, the external storage interface 2326 can be configured to provide access to cloud storage sources as if those sources were physically connected to the computer 2302.

The computer 2302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 24 is a schematic block diagram of a sample computing environment 2400 with which the disclosed subject matter can interact. The sample computing environment 2400 includes one or more client(s) 2402. The client(s) 2402 can be hardware and/or software (e.g., threads, processes, computing devices). The sample computing environment 2400 also includes one or more server(s) 2404. The server(s) 24104 can also be hardware and/or software (e.g., threads, processes, computing devices). The servers 2404 can house threads to perform transformations by employing one or more embodiments as described herein, for example. One possible communication between a client 2402 and servers 2404 can be in the form of a data packet adapted to be transmitted between two or more computer processes. The sample computing environment 2400 includes a communication framework 2406 that can be employed to facilitate communications between the client(s) 2402 and the server(s) 2404. The client(s) 2402 are operably connected to one or more client data store(s) 2408 that can be employed to store information local to the client(s) 2402. Similarly, the server(s) 2404 are operably connected to one or more server data store(s) 24110 that can be employed to store information local to the servers 2404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory configured to store system project data that, in response to deployment and execution on one or more industrial devices, facilitates monitoring and control of an industrial automation system; and
a processor, operatively coupled to the memory that executes executable components stored on the memory, wherein the executable components comprise:
a user interface component configured to receive, from one or more client devices, edit records defining modifications to the system project data; and
a collaboration management component configured to:
classify a first subset of the edit records that are applied to the system project data as applied edit records,
classify a second subset of the edit records that are not applied to the system project data as unapplied edit records,
in response to receipt of a first instruction to set a current version of the system project data as a milestone version, create a milestone record identifying a set of edit records that are applied to the system project data, and
in response to receipt of a second instruction to roll the system project data back to the milestone version, selectively re-apply or un-apply, relative to the system project data, edits represented by selected edit records to restore, to the system project data, the set of edit records identified by the milestone record, wherein re-application of the edits comprises applying, to the system project data, a subset of the edit records that are classified as unapplied edit records and that are identified by the milestone record.

2. The system of claim 1, wherein the collaboration management component is configured to, in response to the receipt of the second instruction to roll the system project data back to the milestone version, undo, from the system project data, a subset of the edit records that are classified as applied edit records and that are not identified by the milestone record.

3. The system of claim 2, wherein the collaboration component is further configured to, in response to an undoing of an edit record, of the subset of the edit records that are classified as applied edit records and that are not identified by the milestone record, send a notification of removal of the edit record to a client device associated with a user from whom the edit record was received.

4. The system of claim 1, wherein the collaboration management component is further configured to:
    determine whether first project modifications defined by a first edit record conflict with second project modifications defined by a second edit record and which have been applied to the system project data, and
    in response to determining that the first project modifications do not conflict with the second project modifications, apply the first project modifications to the system project data and store the first edit record in association with the system project data as one of the applied edit records.

5. The system of claim 1, wherein the collaboration management component is further configured to, in response to determining that first project modifications defined by a first edit record conflicts with second project modifications defined by a second edit record and currently applied to the system project data, apply one or more conflict resolution rules to select between the first edit record and the second edit record for application to the system project data.

6. The system of claim 5, wherein the collaboration management component is further configured to, in response to determining, based on application of the one or more conflict resolution rules, that the first edit record is to be applied instead of the second edit record:
    roll back the second project modifications from the system project data,
    apply the first project modifications to the system project data,
    store the first edit record in association with the system project data as one of the applied edit records, and
    store the second edit record in association with the system project data as one of the unapplied edit records.

7. The system of claim 5, wherein
    the first project modifications and the second project modifications comprise alternate versions of a modification to a same aspect of the system project data, and
    the collaboration management component is configured to select one of the first edit record or the second edit record for inclusion in the system project data based on a comparison of the first project modifications and the second project modifications relative to a selection criterion defined by the one or more conflict resolution rules.

8. The system of claim 1, wherein the user interface component is further configured to render the edit records associated with the system project data in a browsable format according to one or more classification categories.

9. The system of claim 1, wherein the collaboration management component is further configured to, in response to receipt of an instruction from a client device to apply an unapplied edit record, of the unapplied edit records, apply project modifications defined by the unapplied edit record to the system project data.

10. A method, comprising:
    maintaining, on a system comprising a processor, system project data that, in response to execution on one or more industrial devices, facilitates monitoring and control of an industrial automation system;
    receiving, by the system from one or more client devices, edit records defining modifications requested to be performed on the system project data;
    classifying a first subset of the edit records that are applied to the system project data as applied edit records;
    classifying, by the system, a second subset of the edit records that are not applied to the system project data as unapplied edit records;
    in response to receiving a first instruction to set a current version of the system project data as a milestone version, creating, by the system, a milestone record identifying a set of edit records that are currently applied to the system project data; and
    in response to receiving a second instruction to restore the system project data to the milestone version, reverting the system project data to the milestone version, wherein the reverting comprises at least re-applying edits defined by one of the unapplied edit records to the system project data in response to determining that the one of the applied edit records is identified by the milestone record.

11. The method of claim 10, wherein the reverting further comprises undoing edits defined by one of the applied edit records from the system project data in response to determining that the one of the applied edit records is not identified by the milestone record.

12. The method of claim 11, further comprising, in response to the undoing, sending, by the system, a notification of the undoing to a client device associated with a user from whom the one of the applied edit records was received.

13. The method of claim 10, further comprising:
    determining, by the system, whether first project modifications defined by a first edit record conflict with second project modifications defined by a second edit record and which have been applied to the system project data; and
    in response to determining that the first project modifications do not conflict with the second project modifications:
    applying, by the system, the first project modifications to the system project data; and
    storing the first edit record in association with the system project data as one of the applied edit records.

14. The method of claim 10, further comprising, in response to determining that first project modifications defined by a first edit record conflicts with second project modifications defined by a second edit record and currently applied to the system project data, applying, by the system, one or more conflict resolution rules to select between the first edit record and the second edit record for application to the system project data.

15. The method of claim 14, further comprising, in response to determining, based on application of the one or more conflict resolution rules, that the first edit record is to be applied instead of the second edit record:
    undoing, by the system, the second project modifications from the system project data,
    applying, by the system, the first project modifications to the system project data,
    storing, by the system, the first edit record in association with the system project data as one of the applied edit records, and
    storing, by the system, the second edit record in association with the system project data as one of the unapplied edit records.

16. The method of claim 14, wherein
    the first project modifications and the second project modifications comprise alternate versions of a modification to a same aspect of the system project data, and
    the applying the one or more conflict resolution rules comprises selecting one of the first edit record or the second edit record for application to the system project data based on a comparison of the first project modifications and the second project modifications relative to a selection criterion defined by the one or more conflict resolution rules.

17. The method of claim 10, further comprising rendering, by the system, the edit records in a browsable format according to one or more classification categories.

18. The method of claim 10, further comprising, in response to receiving an instruction from a client device to apply an unapplied edit record, of the unapplied edit records, applying project modifications defined by the unapplied edit record to the system project data.

19. A non-transitory computer-readable medium having stored thereon instructions that, in response to execution, cause a system comprising a processor to perform operations, the operations comprising:

maintaining system project data that, in response to execution on one or more industrial devices, facilitates monitoring and control of an industrial automation system;

receiving, from one or more client devices, edit records defining edits to be applied the system project data;

classifying a first subset of the edit records that are applied to the system project data as applied edit records;

classifying a second subset of the edit records that are not applied to the system project data as unapplied edit records;

in response to receiving a first instruction to set a current version of the system project data as a milestone version, generating a milestone record identifying a set of edit records that are currently applied to the system project data; and in response to receiving a second instruction to restore the system project data to the milestone version, reverting the system project data to the milestone version, wherein the reverting comprises at least re-applying edits defined by one of the unapplied edit records to the system project data in response to determining that the one of the applied edit records is identified by the milestone record.

20. The non-transitory computer-readable medium of claim 19, the reverting further comprises undoing edits defined by one of the applied edit records from the system project data in response to determining that the one of the applied edit records is not identified by the milestone record.

* * * * *